(12) United States Patent
Fisher et al.

(10) Patent No.: US 12,190,285 B2
(45) Date of Patent: Jan. 7, 2025

(54) INVENTORY TRACKING SYSTEM AND METHOD THAT IDENTIFIES GESTURES OF SUBJECTS HOLDING INVENTORY ITEMS

(71) Applicant: STANDARD COGNITION, CORP, San Francisco, CA (US)

(72) Inventors: Jordan E. Fisher, San Francisco, CA (US); Nicholas J. Locascio, San Francisco, CA (US); Michael S. Suswal, San Francisco, CA (US)

(73) Assignee: Standard Cognition, Corp., San Francisco, CA (US)

( * ) Notice: Subject to any disclaimer, the term of this patent is extended or adjusted under 35 U.S.C. 154(b) by 196 days.

(21) Appl. No.: 17/579,465

(22) Filed: Jan. 19, 2022

(65) Prior Publication Data

US 2022/0147913 A1    May 12, 2022

Related U.S. Application Data

(63) Continuation of application No. 16/519,660, filed on Jul. 23, 2019, now Pat. No. 11,250,376, which is a
(Continued)

(51) Int. Cl.
*G06Q 10/087* (2023.01)
*G06N 3/045* (2023.01)
(Continued)

(52) U.S. Cl.
CPC ........... *G06Q 10/087* (2013.01); *G06N 3/045* (2023.01); *G06N 3/08* (2013.01); *G06T 7/292* (2017.01);
(Continued)

(58) Field of Classification Search
CPC ........ G06N 3/045; G06N 3/08; G06Q 10/087; G06T 2207/10016; G06T 2207/20081;
(Continued)

(56) References Cited

U.S. PATENT DOCUMENTS 4,746,830 A   5/1988   Holland
5,734,722 A   3/1998   Halpern
(Continued)

FOREIGN PATENT DOCUMENTS

CA      2497795 A1    8/2006
CN     104850846 A    8/2015
(Continued)

OTHER PUBLICATIONS

Amazon, "Amazon Go Frequently Asked Questions", 4 pages. Retrieved on Feb. 23, 2022. Retrieved from the Internet [URL: <https://www.amazon.com/b?node=16008589011> ].
(Continued)

*Primary Examiner* — Anner N Holder
(74) *Attorney, Agent, or Firm* — Haynes Beffel & Wolfeld LLP; Andrew L Dunlap

(57) ABSTRACT

A method for identifying gestures in an area of real space is provided. The method including using a plurality of sensors to produce respective sequences of frames of corresponding fields of view in the area of real space, detecting subjects in the area of real space, using a sequence of frames produced by a corresponding sensor in the plurality of sensors in a first inference engine to identify inventory items carried by the detected subjects in the sequence of frames, using outputs of the first inference engine over a period of time in a second inference engine to identify gestures of the detected subjects, and storing the identified gestures in a database.

20 Claims, 14 Drawing Sheets

Related U.S. Application Data continuation-in-part of application No. 15/945,473, filed on Apr. 4, 2018, now Pat. No. 10,474,988, which is a continuation-in-part of application No. 15/907,112, filed on Feb. 27, 2018, now Pat. No. 10,133,933, which is a continuation-in-part of application No. 15/847,796, filed on Dec. 19, 2017, now Pat. No. 10,055,853.

(60) Provisional application No. 62/703,785, filed on Jul. 26, 2018, provisional application No. 62/542,077, filed on Aug. 7, 2017.

(51) Int. Cl.

| | | |
|---|---|---|
| *G06N 3/08* | (2023.01) | |
| *G06T 7/292* | (2017.01) | |
| *G06T 7/70* | (2017.01) | |
| *G06V 10/764* | (2022.01) | |
| *G06V 10/82* | (2022.01) | |
| *G06V 20/52* | (2022.01) | |
| *G06V 40/20* | (2022.01) | |
| *H04N 23/90* | (2023.01) | |

(52) U.S. Cl.
CPC .............. *G06T 7/70* (2017.01); *G06V 10/764* (2022.01); *G06V 10/82* (2022.01); *G06V 20/52* (2022.01); *G06V 40/28* (2022.01); *H04N 23/90* (2023.01); *G06T 2207/10016* (2013.01); *G06T 2207/20084* (2013.01); *G06T 2207/30196* (2013.01)

(58) Field of Classification Search
CPC . G06T 2207/20084; G06T 2207/30196; G06T 2207/30241; G06T 7/246; G06T 7/292; G06T 7/70; H04N 23/90; G06V 10/764; G06V 10/82; G06V 20/52; G06V 40/28
See application file for complete search history.

(56) References Cited

U.S. PATENT DOCUMENTS

| | | | |
|---|---|---|---|
| 5,745,036 | A | 4/1998 | Clare |
| 6,154,559 | A | 11/2000 | Beardsley |
| 6,561,417 | B1 | 5/2003 | Gadd |
| 6,584,375 | B2 | 6/2003 | Bancroft et al. |
| 6,768,102 | B1 | 7/2004 | Skoll |
| 7,050,624 | B2 | 5/2006 | Dialameh et al. |
| 7,050,652 | B2 | 5/2006 | Stanek |
| 7,240,027 | B2 | 7/2007 | McConnell et al. |
| 7,693,757 | B2 | 4/2010 | Zimmerman |
| 7,742,623 | B1 | 6/2010 | Moon et al. |
| 8,009,863 | B1 | 8/2011 | Sharma et al. |
| 8,219,438 | B1 | 7/2012 | Moon et al. |
| 8,261,256 | B1 | 9/2012 | Adler et al. |
| 8,279,325 | B2 | 10/2012 | Pitts et al. |
| 8,452,868 | B2 | 5/2013 | Shafer et al. |
| 8,577,705 | B1 | 11/2013 | Baboo et al. |
| 8,624,725 | B1 | 1/2014 | MacGregor |
| 8,749,630 | B2 | 6/2014 | Alahi et al. |
| 8,897,741 | B2 | 11/2014 | Johnson |
| 9,033,229 | B2 | 5/2015 | Matsuhisa et al. |
| 9,036,028 | B2 | 5/2015 | Buehler |
| 9,058,523 | B2 | 6/2015 | Merkel et al. |
| 9,147,174 | B2 | 9/2015 | Glickman et al. |
| 9,171,442 | B2 | 10/2015 | Clements |
| 9,262,681 | B1 | 2/2016 | Mishra |
| 9,269,012 | B2 | 2/2016 | Fotland |
| 9,269,093 | B2 | 2/2016 | Lee et al. |
| 9,294,873 | B1 | 3/2016 | MacGregor |
| 9,390,032 | B1 | 7/2016 | Baldwin |
| 9,449,233 | B2 | 9/2016 | Taylor |
| 9,489,623 | B1 | 11/2016 | Sinyavskiy et al. |
| 9,494,532 | B2 | 11/2016 | Xie et al. |
| 9,536,177 | B2 | 1/2017 | Chalasani et al. |
| 9,582,891 | B2 | 2/2017 | Geiger et al. |
| 9,595,127 | B2 | 3/2017 | Champion et al. |
| 9,652,751 | B2 | 5/2017 | Aaron et al. |
| 9,693,333 | B2 | 6/2017 | Alles et al. |
| 9,846,810 | B2 | 12/2017 | Partis |
| 9,881,221 | B2 | 1/2018 | Bala et al. |
| 9,886,827 | B2 | 2/2018 | Schoner |
| 9,911,290 | B1 | 3/2018 | Zalewski et al. |
| 10,055,853 | B1 | 8/2018 | Fisher et al. |
| 10,083,453 | B2 | 9/2018 | Campbell |
| 10,127,438 | B1 | 11/2018 | Fisher et al. |
| 10,133,933 | B1 | 11/2018 | Fisher et al. |
| 10,165,194 | B1 | 12/2018 | Baldwin |
| 10,169,677 | B1 | 1/2019 | Ren et al. |
| 10,175,340 | B1 | 1/2019 | Abari et al. |
| 10,176,452 | B2 | 1/2019 | Rizzolo et al. |
| 10,192,408 | B2 | 1/2019 | Schoner |
| 10,202,135 | B2 | 2/2019 | Mian et al. |
| 10,210,603 | B2 | 2/2019 | Venable et al. |
| 10,210,737 | B2 | 2/2019 | Zhao |
| 10,217,120 | B1 | 2/2019 | Shin et al. |
| 10,242,393 | B1 | 3/2019 | Kumar et al. |
| 10,257,708 | B1 | 4/2019 | Kamkar et al. |
| 10,262,331 | B1 | 4/2019 | Sharma et al. |
| 10,282,720 | B1 | 5/2019 | Buibas et al. |
| 10,282,852 | B1 | 5/2019 | Buibas et al. |
| 10,332,089 | B1 | 6/2019 | Asmi et al. |
| 10,354,262 | B1 | 7/2019 | Hershey et al. |
| 10,373,322 | B1 | 8/2019 | Buibas et al. |
| 10,387,896 | B1 | 8/2019 | Hershey et al. |
| 10,438,277 | B1 | 10/2019 | Jiang et al. |
| 10,445,694 | B2 | 10/2019 | Fisher et al. |
| 10,474,877 | B2 | 11/2019 | Huang et al. |
| 10,474,988 | B2 | 11/2019 | Fisher et al. |
| 10,474,991 | B2 | 11/2019 | Fisher et al. |
| 10,474,992 | B2 | 11/2019 | Fisher et al. |
| 10,474,993 | B2 | 11/2019 | Fisher et al. |
| 10,515,518 | B2 | 12/2019 | Cantley et al. |
| 10,529,137 | B1 | 1/2020 | Black et al. |
| 10,535,146 | B1 | 1/2020 | Buibas et al. |
| 10,580,099 | B2 | 3/2020 | Branscomb et al. |
| 10,650,545 | B2 | 5/2020 | Fisher et al. |
| 10,699,537 | B1 | 6/2020 | Schoner |
| 10,776,926 | B2 | 9/2020 | Shrivastava |
| 10,810,539 | B1 | 10/2020 | Mohanty et al. |
| 10,846,996 | B2 | 11/2020 | Schoner |
| 10,853,965 | B2 | 12/2020 | Fisher et al. |
| 11,132,810 | B2 | 9/2021 | Kume et al. |
| 11,250,376 | B2 | 2/2022 | Fisher et al. |
| 11,295,270 | B2 | 4/2022 | Fisher et al. |
| 11,301,684 | B1 | 4/2022 | Kumar et al. |
| 2003/0078849 | A1 | 4/2003 | Snyder |
| 2003/0107649 | A1 | 6/2003 | Flickner et al. |
| 2004/0099736 | A1 | 5/2004 | Neumark |
| 2004/0131254 | A1 | 7/2004 | Liang et al. |
| 2005/0177446 | A1 | 8/2005 | Hoblit |
| 2005/0201612 | A1 | 9/2005 | Park et al. |
| 2006/0132491 | A1 | 6/2006 | Riach et al. |
| 2006/0279630 | A1 | 12/2006 | Aggarwal et al. |
| 2007/0021863 | A1 | 1/2007 | Mountz et al. |
| 2007/0021864 | A1 | 1/2007 | Mountz et al. |
| 2007/0182718 | A1 | 8/2007 | Schoener et al. |
| 2007/0282665 | A1 | 12/2007 | Buehler et al. |
| 2008/0001918 | A1 | 1/2008 | Hsu et al. |
| 2008/0159634 | A1 | 7/2008 | Sharma et al. |
| 2008/0170776 | A1 | 7/2008 | Albertson et al. |
| 2008/0181507 | A1 | 7/2008 | Gope et al. |
| 2008/0211915 | A1 | 9/2008 | McCubbrey |
| 2008/0243614 | A1 | 10/2008 | Tu et al. |
| 2009/0041297 | A1 | 2/2009 | Zhang et al. |
| 2009/0057068 | A1 | 3/2009 | Lin et al. |
| 2009/0083815 | A1 | 3/2009 | McMaster et al. |
| 2009/0217315 | A1 | 8/2009 | Malik et al. |
| 2009/0222313 | A1 | 9/2009 | Kannan et al. |
| 2009/0228408 | A1* | 9/2009 | Kaushal .................. G06N 5/04 714/26 |
| 2009/0307226 | A1 | 12/2009 | Koster et al. |

(56) References Cited

U.S. PATENT DOCUMENTS

| | | |
|---|---|---|
| 2010/0021009 A1 | 1/2010 | Yao |
| 2010/0103104 A1 | 4/2010 | Son et al. |
| 2010/0138281 A1 | 6/2010 | Zhang et al. |
| 2010/0208941 A1 | 8/2010 | Broaddus et al. |
| 2010/0283860 A1 | 11/2010 | Nader |
| 2011/0141011 A1 | 6/2011 | Lashina et al. |
| 2011/0209042 A1 | 8/2011 | Porter |
| 2011/0228976 A1 | 9/2011 | Fitzgibbon et al. |
| 2011/0317012 A1 | 12/2011 | Hammadou |
| 2011/0317016 A1 | 12/2011 | Saeki et al. |
| 2011/0320322 A1 | 12/2011 | Roslak et al. |
| 2012/0119879 A1 | 5/2012 | Estes et al. |
| 2012/0137256 A1 | 5/2012 | Lalancette et al. |
| 2012/0154604 A1 | 6/2012 | Chen et al. |
| 2012/0159290 A1 | 6/2012 | Pulsipher et al. |
| 2012/0209749 A1 | 8/2012 | Hammad et al. |
| 2012/0245974 A1 | 9/2012 | Bonner et al. |
| 2012/0271712 A1 | 10/2012 | Katzin et al. |
| 2012/0275686 A1 | 11/2012 | Wilson et al. |
| 2012/0290401 A1 | 11/2012 | Neven |
| 2013/0011007 A1 | 1/2013 | Muriello et al. |
| 2013/0011049 A1 | 1/2013 | Kimura |
| 2013/0060708 A1 | 3/2013 | Oskolkov et al. |
| 2013/0076898 A1 | 3/2013 | Philippe et al. |
| 2013/0142384 A1 | 6/2013 | Ofek |
| 2013/0156260 A1 | 6/2013 | Craig |
| 2013/0182114 A1 | 7/2013 | Zhang et al. |
| 2013/0201339 A1 | 8/2013 | Venkatesh |
| 2013/0235206 A1 | 9/2013 | Smith et al. |
| 2013/0337789 A1 | 12/2013 | Johnson |
| 2014/0168477 A1 | 6/2014 | David |
| 2014/0188648 A1 | 7/2014 | Argue et al. |
| 2014/0207615 A1 | 7/2014 | Li et al. |
| 2014/0222501 A1 | 8/2014 | Hirakawa et al. |
| 2014/0282162 A1 | 9/2014 | Fein et al. |
| 2014/0285660 A1 | 9/2014 | Jamtgaard et al. |
| 2014/0300539 A1* | 10/2014 | Tong ................ G06V 40/28 345/156 |
| 2014/0300736 A1 | 10/2014 | Reitinger et al. |
| 2014/0304123 A1 | 10/2014 | Schwartz |
| 2015/0002675 A1 | 1/2015 | Kundu et al. |
| 2015/0009323 A1 | 1/2015 | Lei |
| 2015/0012396 A1 | 1/2015 | Puerini et al. |
| 2015/0019391 A1 | 1/2015 | Kumar et al. |
| 2015/0026010 A1 | 1/2015 | Ellison |
| 2015/0026646 A1 | 1/2015 | Ahn et al. |
| 2015/0029339 A1 | 1/2015 | Kobres et al. |
| 2015/0039458 A1 | 2/2015 | Reid |
| 2015/0049914 A1 | 2/2015 | Alves |
| 2015/0085111 A1 | 3/2015 | Lavery |
| 2015/0124107 A1 | 5/2015 | Muriello et al. |
| 2015/0193761 A1 | 7/2015 | Svetal |
| 2015/0206188 A1 | 7/2015 | Tanigawa et al. |
| 2015/0208043 A1 | 7/2015 | Lee et al. |
| 2015/0213391 A1 | 7/2015 | Hasan |
| 2015/0221094 A1 | 8/2015 | Marcheselli et al. |
| 2015/0222861 A1 | 8/2015 | Fujii et al. |
| 2015/0262116 A1 | 9/2015 | Katircioglu et al. |
| 2015/0269740 A1 | 9/2015 | Mazurenko et al. |
| 2015/0294397 A1 | 10/2015 | Croy et al. |
| 2015/0302593 A1 | 10/2015 | Mazurenko et al. |
| 2015/0310459 A1 | 10/2015 | Bernal et al. |
| 2015/0327794 A1 | 11/2015 | Rahman et al. |
| 2015/0332312 A1 | 11/2015 | Cosman |
| 2015/0363868 A1 | 12/2015 | Kleinhandler et al. |
| 2015/0379366 A1 | 12/2015 | Nomura et al. |
| 2016/0095511 A1 | 4/2016 | Taguchi et al. |
| 2016/0110760 A1 | 4/2016 | Herring et al. |
| 2016/0125245 A1 | 5/2016 | Saitwal et al. |
| 2016/0155011 A1 | 6/2016 | Sulc et al. |
| 2016/0162715 A1 | 6/2016 | Luk et al. |
| 2016/0171707 A1 | 6/2016 | Schwartz |
| 2016/0188962 A1 | 6/2016 | Taguchi |
| 2016/0189286 A1 | 6/2016 | Zohar et al. |
| 2016/0203525 A1 | 7/2016 | Hara et al. |
| 2016/0217157 A1 | 7/2016 | Shih et al. |
| 2016/0217417 A1 | 7/2016 | Ma et al. |
| 2016/0232677 A1 | 8/2016 | Liao et al. |
| 2016/0259994 A1 | 9/2016 | Ravindran et al. |
| 2016/0358145 A1 | 12/2016 | Montgomery |
| 2016/0371726 A1 | 12/2016 | Yamaji et al. |
| 2016/0381328 A1 | 12/2016 | Zhao |
| 2017/0024806 A1 | 1/2017 | High et al. |
| 2017/0032193 A1 | 2/2017 | Yang |
| 2017/0068861 A1 | 3/2017 | Miller et al. |
| 2017/0104979 A1 | 4/2017 | Shaw et al. |
| 2017/0116473 A1 | 4/2017 | Sashida et al. |
| 2017/0124096 A1 | 5/2017 | Hsi et al. |
| 2017/0132492 A1 | 5/2017 | Xie et al. |
| 2017/0148005 A1 | 5/2017 | Murn |
| 2017/0154212 A1 | 6/2017 | Feris et al. |
| 2017/0154246 A1* | 6/2017 | Guttmann ................ H04W 4/38 |
| 2017/0161555 A1* | 6/2017 | Kumar ................ G06N 3/044 |
| 2017/0168586 A1 | 6/2017 | Sinha et al. |
| 2017/0178226 A1 | 6/2017 | Graham et al. |
| 2017/0206664 A1 | 7/2017 | Shen |
| 2017/0206669 A1 | 7/2017 | Saleemi et al. |
| 2017/0249339 A1 | 8/2017 | Lester |
| 2017/0255990 A1 | 9/2017 | Ramamurthy et al. |
| 2017/0278255 A1 | 9/2017 | Shingu et al. |
| 2017/0308911 A1 | 10/2017 | Barham et al. |
| 2017/0309136 A1 | 10/2017 | Schoner |
| 2017/0323376 A1 | 11/2017 | Glaser et al. |
| 2018/0003315 A1 | 1/2018 | Reed |
| 2018/0012072 A1 | 1/2018 | Glaser et al. |
| 2018/0012080 A1 | 1/2018 | Glaser et al. |
| 2018/0014382 A1 | 1/2018 | Glaser et al. |
| 2018/0025175 A1 | 1/2018 | Kato |
| 2018/0032799 A1 | 2/2018 | Marcheselli et al. |
| 2018/0032840 A1* | 2/2018 | Yu ........................ G06V 10/774 |
| 2018/0033015 A1 | 2/2018 | Opalka et al. |
| 2018/0033151 A1 | 2/2018 | Matsumoto et al. |
| 2018/0068431 A1 | 3/2018 | Takeda et al. |
| 2018/0070056 A1 | 3/2018 | DeAngelis et al. |
| 2018/0088900 A1 | 3/2018 | Glaser et al. |
| 2018/0150788 A1 | 5/2018 | Vepakomma et al. |
| 2018/0165728 A1 | 6/2018 | McDonald et al. |
| 2018/0165733 A1 | 6/2018 | Kundu et al. |
| 2018/0181995 A1 | 6/2018 | Burry et al. |
| 2018/0189600 A1 | 7/2018 | Astrom et al. |
| 2018/0217223 A1 | 8/2018 | Kumar et al. |
| 2018/0225625 A1 | 8/2018 | DiFatta et al. |
| 2018/0232796 A1 | 8/2018 | Glaser et al. |
| 2018/0240180 A1 | 8/2018 | Glaser et al. |
| 2018/0295424 A1 | 10/2018 | Taylor et al. |
| 2018/0322616 A1 | 11/2018 | Guigues |
| 2018/0329762 A1 | 11/2018 | Li et al. |
| 2018/0332235 A1 | 11/2018 | Glaser |
| 2018/0332236 A1 | 11/2018 | Glaser et al. |
| 2018/0343417 A1 | 11/2018 | Davey |
| 2018/0365481 A1 | 12/2018 | Tolbert et al. |
| 2018/0365755 A1 | 12/2018 | Bekbolatov et al. |
| 2018/0373928 A1 | 12/2018 | Glaser et al. |
| 2019/0005479 A1 | 1/2019 | Glaser et al. |
| 2019/0007496 A1* | 1/2019 | Khanna ................ H04L 45/02 |
| 2019/0019309 A1 | 1/2019 | Herrli et al. |
| 2019/0034735 A1 | 1/2019 | Cuban et al. |
| 2019/0043003 A1 | 2/2019 | Fisher et al. |
| 2019/0057435 A1 | 2/2019 | Chomley et al. |
| 2019/0147709 A1 | 5/2019 | Schoner |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1 | 5/2019 | Fisher et al. |
| 2019/0158813 A1 | 5/2019 | Rowell et al. |
| 2019/0188876 A1 | 6/2019 | Song et al. |
| 2019/0244386 A1 | 8/2019 | Fisher et al. |
| 2019/0244500 A1 | 8/2019 | Fisher et al. |
| 2019/0251340 A1 | 8/2019 | Brown et al. |
| 2019/0347611 A1 | 11/2019 | Fisher et al. |
| 2019/0377957 A1 | 12/2019 | Johnston et al. |
| 2019/0378205 A1 | 12/2019 | Glaser et al. |

(56) References Cited

U.S. PATENT DOCUMENTS

| | | |
|---|---|---|
| 2019/0392318 A1 | 12/2019 | Ghafoor et al. |
| 2020/0034988 A1 | 1/2020 | Zhou |
| 2020/0074165 A1 | 3/2020 | Ghafoor et al. |
| 2020/0074393 A1 | 3/2020 | Fisher et al. |
| 2020/0074394 A1 | 3/2020 | Fisher et al. |
| 2020/0074432 A1 | 3/2020 | Valdman et al. |
| 2020/0118400 A1 | 4/2020 | Zalewski et al. |
| 2020/0125824 A1 | 4/2020 | Mabyalaht et al. |
| 2020/0134588 A1 | 4/2020 | Nelms et al. |
| 2020/0151692 A1 | 5/2020 | Gao et al. |
| 2020/0193507 A1 | 6/2020 | Glaser et al. |
| 2020/0234463 A1 | 7/2020 | Fisher et al. |
| 2020/0258241 A1 | 8/2020 | Liu et al. |
| 2020/0293992 A1 | 9/2020 | Bogolea et al. |
| 2020/0334834 A1 | 10/2020 | Fisher |
| 2020/0334835 A1 | 10/2020 | Buibas et al. |
| 2020/0410713 A1 | 12/2020 | Auer et al. |
| 2021/0067744 A1 | 3/2021 | Buibas et al. |
| 2021/0158430 A1 | 5/2021 | Buibas et al. |
| 2021/0201253 A1 | 7/2021 | Fisher et al. |
| 2021/0279475 A1* | 9/2021 | Tusch ............... H04L 63/0861 |
| 2021/0295081 A1 | 9/2021 | Berry et al. |

FOREIGN PATENT DOCUMENTS

| | | |
|---|---|---|
| CN | 105069413 A | 11/2015 |
| CN | 105701519 A | 6/2016 |
| CN | 104778690 B | 6/2017 |
| CN | 108055390 A | 5/2018 |
| EP | 1574986 B1 | 7/2008 |
| EP | 2555162 A1 | 2/2013 |
| EP | 3002710 A1 | 4/2016 |
| EP | 3474183 A1 | 4/2019 |
| EP | 3474184 A1 | 4/2019 |
| GB | 2560387 A | 9/2018 |
| GB | 2566762 A | 3/2019 |
| JP | 2011253344 A | 12/2011 |
| JP | 2013196199 A | 9/2013 |
| JP | 2014089626 A | 5/2014 |
| JP | 2016206782 A | 12/2016 |
| JP | 2017157216 A | 9/2017 |
| JP | 2018099317 A | 6/2018 |
| KR | 1020180032400 A | 3/2018 |
| KR | 1020190093733 A | 8/2019 |
| KR | 102223570 B1 | 3/2021 |
| SE | 1751401 A1 | 6/2018 |
| TW | 201445474 A | 12/2014 |
| TW | 201504964 A | 2/2015 |
| TW | 201725545 A | 7/2017 |
| TW | 201911119 A | 3/2019 |
| WO | 0021021 A1 | 4/2000 |
| WO | 0243352 A2 | 5/2002 |
| WO | 02059836 A3 | 5/2003 |
| WO | 2008029159 A1 | 3/2008 |
| WO | 2009027839 A2 | 3/2009 |
| WO | 2012067646 A1 | 5/2012 |
| WO | 2013033442 A1 | 3/2013 |
| WO | 2013041444 A1 | 3/2013 |
| WO | 2013103912 A1 | 7/2013 |
| WO | 2014133779 A1 | 9/2014 |
| WO | 2015033577 A1 | 3/2015 |
| WO | 2015040661 A1 | 3/2015 |
| WO | 2015133699 A1 | 9/2015 |
| WO | 2015173869 A1 | 11/2015 |
| WO | 2016136144 A1 | 9/2016 |
| WO | 2016166508 A1 | 10/2016 |
| WO | 2017015390 A1 | 1/2017 |
| WO | 2017151241 A2 | 9/2017 |
| WO | 2017163909 A1 | 9/2017 |
| WO | 2017196822 A1 | 11/2017 |
| WO | 2018013438 A1 | 1/2018 |
| WO | 2018013439 A1 | 1/2018 |
| WO | 2018148613 A1 | 8/2018 |
| WO | 2018162929 A1 | 9/2018 |
| WO | 2018209156 A1 | 11/2018 |
| WO | 2018237210 A1 | 12/2018 |
| WO | 2019032304 A1 | 2/2019 |
| WO | 2019032305 A2 | 2/2019 |
| WO | 2019032306 A1 | 2/2019 |
| WO | 2019032307 A1 | 2/2019 |
| WO | 2020023795 | 1/2020 |
| WO | 2020023796 | 1/2020 |
| WO | 2020023798 | 1/2020 |
| WO | 2020023799 | 1/2020 |
| WO | 2020023801 | 1/2020 |
| WO | 2020023926 | 1/2020 |
| WO | 2020023930 | 1/2020 |
| WO | 2020047555 A1 | 3/2020 |
| WO | 2020214775 A1 | 10/2020 |
| WO | 2020225562 A1 | 11/2020 |

OTHER PUBLICATIONS

Cao et al, "Leveraging Convolutional Pose Machines for Fast and Accurate Head Pose Estimation", 2018 IEEE/RSJ International Conference on Intelligent Robots and Systems (IROS), Oct. 1, 2018. pp. 1089-1094.

DeTone et al., SuperPoint: Self-Supervised Interest Point Detection and Description, Apr. 19, 2018, arXiv:1712.07629v4 [cs.CV] Apr. 19, 2018, 13 pages.

EDYN Company, Oakland, CA, Retrieved from the internt [URL: <https://edyn.com/>]. Retrieved on May 5, 2017. 12 pages.

Erdem et al. "Automated camera layout to satisfy task-specific and floor plan-specific coverage requirements," Computer Vision and Image Undertanding 103, Aug. 1, 2006, 156-169.

Keulian, "Naraffar, the First Staffless Convenience Store," "Stephane Keulian: Your fix of retail insights Blog" Retrieved on May 5, 2017. 3 pages. Retrieved from the internet [URL: <http://stephanekeulian.com/en/naraffar-first-staffees-convenience-store/>].

Lin et al., Energy-Accuracy Trade-off for Continuous Mobile Device Location, MobiSys'10, Jun. 15-18, 2010, San Francisco, California, 13 pages.

Prindle, This Automated Store in Sweden Doesn't have Any Human Employees—Only a Smartphone App, Digital Trends, dated Feb. 29, 2016, 6 pages. Retrieved on Feb. 23, 2022. Retrieved from the internet [URL: <https://www.digitaltrends.com/cool-tech/sweden-app-enabled-automated-store/>].

Wei et al., "Convolutional Pose Machine", Proceedings of the IEEE conference on Computer Vision and Pattern Recognition, Jun. 27, 2016, pp. 4724-4732.

Yusoff et al. "Optimal Camera Placement for 3D Environment," ICSECS 2011: Software Engineering and Computer Systems, Jun. 27-29, 2011, 448-459.

Black et al., "Multi View Image Surveillance and Tracking," IEEE Proceedings of the Workshop on Motion and Video Computing, 2002, pp. 1-6.

Camplani et al., "Background foreground segmentation with RGB-D Kinect data: An efficient combination of classifiers", Journal of Visual Communication and Image Representation, Academic Press, Inc., US, vol. 25, No. 1, Mar. 27, 2013, pp. 122-136,XP028804219, ISSN: 1047-3203, DOI: 10.1016/J.JVCIR.2013.03.009.

Ceballos, Scikit-Learn Decision Trees Explained, https://towardsdatascience.com/scikit-learn-decision-trees-explained-803f-3812290d, Feb. 22, 2019, 13 pages.

Gkioxari et al. "R-CNNs for Pose Estimation and Action Detection," Cornell University, Computer Science, Computer Vision and Pattern Recognition, arXiv.org > cs > arXiv:1406.5212, Jun. 19, 2014, 8 pages.

Grinciunaite et al. "Human Pose Estimation in Space and Time Using 3D CNN," ECCV Workshop on Brave new ideas for motion representations in videos, Oct. 2016, 7 pages.

Harville, "Stereo person tracking with adaptive plan-view templates of height and occupancy statistics," Image and Vision Computing, vol. 22, Issue 2, Feb. 1, 2004, pp. 127-142.

He et al. "Identity mappings in deep residual networks" (published at https://arxiv.org/pdf/1603.05027.pdf), Jul. 25, 2016, 15 pages.

(56) References Cited

OTHER PUBLICATIONS

Huang, et al. "Driver's view and vehicle surround estimation using omnidirectional video stream," IEEE IV2003 Intelligent Vehicles Symposium. Proceedings (Cat. No.03TH8683), Jun. 9-11, 2003, pp. 444-449.

Jayabalan, et al., "Dynamic Action Recognition: A convolutional neural network model for temporally organized joint location data," Cornell University, Computer Science, Dec. 20, 2016, 11 pages.

Longuet-Higgens, "A computer algorithm for reconstructing a scene from two projections," Nature 293, Sep. 10, 1981, pp. 133-135.

PCT-US2019-043519—Application as filed on Jul. 25, 2019, 54 pages.

PCT-US2019-043770—Application as filed Jul. 26, 2019, 42 pages.

PCT/US2019-043520—Application as Filed on Jul. 25, 2019, 54 pages.

PCT/US2019-043526—Application as filed on Jul. 25, 2019, 39 pages.

PCT/US2019/043522—Application as filed on Jul. 25, 2019, 55 pages.

PCT/US2019/043523—Application as filed Jul. 25, 2019, 52 pages.

PCT/US2019/043775—Application as filed on Jul. 26, 2019, 54 pages.

Redmon et al., "You Only Look Once: Unified, Real-Time Object Detection," University of Washington, Allen Institute for Aly, Facebook AI Research, May 9, 2016, 10 pages.

Redmon et al., YOLO9000: Better, Faster, Stronger, (available at https://arxiv.org/pdf/1612.08242.pdf), Dec. 25, 2016, 9 pages.

Rossi et al., "Tracking and Counting Moving People," IEEE Int'l Conf. on Image Processing, ICIP-94, Nov. 13-16, 1994, 5 pages.

Symons, "Data Fusion Methods for Netted Sensors with Limited Communication Bandwidth", QinetiQ Ltd and University College London, 2004.

Toshev et al. "DeepPose: Human Pose Estimation via Deep Neural Networks," IEEE Conf. on Computer Vision and Pattern Recognition, Aug. 2014, 8 pages.

U.S. Appl. No. 16/388,765—Application filed Apr. 18, 2019, 96 pages.

Vincze, "Robust tracking of ellipses at frame rate," Pattern Recognition, vol. 34, Issue 2, Feb. 2001, pp. 487-498.

Zhang "A Flexible New Technique for Camera Calibration," IEEE Transactions on Pattern Analysis and Machine Intelligence, vol. 22, No. 11, Nov. 2000, 22pages.

\* cited by examiner

Perspective View of Shelf Unit B in Aisle 116a

```
Joint = {
    (x, y) position of joint,
    joint number (one of 19 possibilities, e.g., 1 = left-ankle, 2 = right-ankle),
    confidence number (describing how confident CNN is in its prediction),
    unique integer-ID for the joint
}
```

Joints data structure 400

FIG. 4

```
Subject = { Key   = frame_number
            Value = { Key   = camera_id
                      Value = Assigned joints to subject
                      [
                          [x of joint1, y of joint1, z of joint1],
                          [x of joint2, y of joint2, z of joint2],
                          ........
                          ........
                          [x of joint18, y of joint18, z of joint18],
                      ]
                    }
          }
```

Subject Data Structure 500

FIG. 5

```
Inventory/Log = {   Key    = Identifier (store_Id / shelf_id / subject_id)
                    Value = { Key   = SKU
                              Value = integer (quantity) + frame number
                            }
                }
```

Inventory/Log Data Structure 614

FIG. 7

Architecture for inventory event sequencing engine to perform inventory item to chronologically related items correlation analysis

INVENTORY TRACKING SYSTEM AND METHOD THAT IDENTIFIES GESTURES OF SUBJECTS HOLDING INVENTORY ITEMS

PRIORITY APPLICATION

This application is a Continuation of U.S. patent application Ser. No. 16/519,660 filed 23 Jul. 2019, which claims the benefit of U.S. Provisional Patent Application No. 62/703,785 filed 26 Jul. 2018, which application is incorporated herein by reference; and is a continuation-in-part of U.S. patent application Ser. No. 15/945,473 (now U.S. Pat. No. 10,474,988, issued 12 Nov. 2019) filed 4 Apr. 2018, which is a continuation-in-part of U.S. Pat. No. 10,133,933, issued 20 Nov. 2018, which is a continuation-in-part of U.S. Pat. No. 10,055,853, issued 21 Aug. 2018, which claims benefit of U.S. Provisional Patent Application No. 62/542,077 filed 7 Aug. 2017, which applications are incorporated herein by reference.

BACKGROUND

Field

The present invention relates to systems that track inventory items in an area of real space including inventory display structures.

Description of Related Art

Manufacturers, distributors, shopping store management are interested to know different activities performed by shoppers related to inventory items in a shopping store. Some examples of activities are shoppers taking the inventory item from shelf, putting the inventory item back on a shelf, or purchasing the inventory item, etc. Consider the example of a shopping store in which the inventory items are placed at multiple inventory locations such as on a shelf in an aisle and on promotional fixtures such as endcaps at the end of an aisle or in an open area. Companies supplying the inventory items and the shopping store management are interested to know which inventory locations contribute more towards the sale of a particular inventory item. Consolidating inventory item sale data from point-of-sale systems can indicate the total number of a particular inventory item sold in a specific period of time such as a day, week or month. However, this information does not identify the inventory locations from where the customers took these inventory items, if inventory items are stocked at multiple inventory locations in the shopping store.

Another information that manufacturers and distributors are interested to know is related to competitor inventory items (or products), especially the inventory items considered by customers just before they decided to buy a particular inventory item. This data can provide useful insights for product design, pricing and marketing strategies. Traditional point of sale systems in shopping stores cannot provide information about alternative inventory items considered by customers before they decide to purchase a particular inventory item.

It is desirable to provide a system that can more effectively and automatically provide the activity data related to inventory items from multiple locations in the shopping store.

SUMMARY

A system and method for operating a system are provided for tracking inventory events, such as puts and takes, in an area of real space. The system is coupled to a plurality of sensors, such as cameras, and to memory which can store a store inventory for the area of real space. The system includes a processor or processors, and a database. The processor or processors can include logic to use sequences of frames produced by sensors in the plurality of sensors to identify gestures by detected persons in the area of real space over a period of time and produce inventory events including data representing identified gestures. The system can include logic to store the inventory events as entries in the database. The inventory events can include a subject identifier identifying a detected subject, a gesture type of a gesture by the detected subject (e.g. a put or a take), an item identifier identifying an inventory item linked to the gesture by the detected subject, a location of the gesture represented by positions in three dimensions of the area of real space and a timestamp for the gesture. Logic can be included in the system to process the data in the database in a variety of manners. Including logic that can query the database to determine a data set including the inventory events for a selected inventory item in multiple locations in the area of real space. The system can displays a graphical construct indicating activity related to the particular inventory item in the multiple locations on user interface.

In one embodiment, the activity related to the particular inventory item includes counts of the inventory events including the particular inventory item in the multiple locations in the period of time. In another embodiment, the activity related to the particular inventory item includes percentages of total inventory events including the particular inventory item in the multiple locations in the period of time. In yet another embodiment, the activity related to the particular item includes levels relative to a threshold count of inventory events including the particular item in the multiple locations in the period of time.

In one embodiment, the field of view of each camera overlaps with the fields of view of at least one other camera in the plurality of cameras.

The system can include first image recognition engines that receive the sequences of image frames. The first image recognition engines process image frames to generate first data sets that identify subjects and locations of the identified subjects in the real space. In one embodiment, the first image recognition engines comprise convolutional neural networks. The system processes the first data sets to specify bounding boxes which include images of hands of the identified subjects in image frames in the sequences of image frames. In one embodiment, the system includes second image recognition engines that receive the sequences of image frames, which process the specified bounding boxes in the image frames to detect the inventory events including identifiers of likely inventory items.

In one embodiment, the system determines the data sets by including the inventory events for the particular inventory item in the area of real space that include a parameter indicating the inventory items as sold to identified subjects.

In one embodiment, the system is coupled to a memory that stores a data set defining a plurality of cells having coordinates in the area of real space. In such an embodiment, the system includes logic that matches the inventory events for the particular inventory item in multiple locations to cells in the data set defining the plurality of cells. The system can include inventory display structures in the area of real space. The inventory display structures comprise of inventory locations matched with the cells in the data set defining the plurality of cells having coordinates in the area of real space. The system matches cells to inventory locations and generates heat maps for inventory locations using the activity related to the particular inventory item in multiple locations.

The system can generate and store in memory a data structure referred to herein as a "realogram," identifying the locations of inventory items in the area of real space based on accumulation of data about the items identified in, and the locations of, the inventory events detected as discussed herein. The data in the realogram can be compared to data in a planogram, to determine how inventory items are disposed in the area compared to the plan, such as to locate misplaced items. Also, the realogram can be processed to locate inventory items in three dimensional cells and correlate those cells with inventory locations in the store, such as can be determined from a planogram or other map of the inventory locations. Also, the realogram can be processed to track activity related to specific inventory items in different locations in the area. Other uses of realograms are possible as well.

In one embodiment, the system selects for a subject a temporally ordered sequence of inventory events leading to a particular inventory event including a particular inventory item. The system determines a data set including inventory items in the temporally ordered sequence of inventory events within a period of time prior to the particular inventory event. The system includes a data structure configured for use to analyze the data to correlate the particular inventory item of a plurality of data sets with other inventory items in the plurality of data sets.

The system can accumulate the plurality of data sets and store the accumulated data sets in the data structure configured for use to analyze the data to correlate the particular inventory item of the plurality of data sets with other inventory items in the plurality of data sets.

In one embodiment, the system selects the inventory item associated with an inventory event in the temporally ordered sequence of inventory events closest in space, or in time, or based on a combination of time and space, to the particular inventory event to determine the data sets including inventory items in the temporally ordered sequence of inventory events. In another embodiment, the system selects, for a subject, a temporally ordered sequence of inventory events leading to a particular inventory event including a particular inventory item that includes a parameter indicating the inventory item as sold to the subject.

In one embodiment, the system filters out the inventory events including inventory items including a parameter indicating the inventory items as sold to subjects from the temporally ordered sequence of inventory events leading to a particular inventory event including a particular inventory item.

The system can select a temporally ordered sequence of inventory events leading to a particular inventory event including a particular inventory item for a subject without the use of personal identifying biometric information associated with the subject.

Methods and computer program products which can be executed by computer systems are also described herein.

Functions are described herein, including but not limited to identifying and linking a particular inventory item in an inventory event to multiple locations in the area of real space and to other items in temporally ordered sequences of inventory events and of creating heat maps and data structure configured for use to analyze correlations of the particular inventory item to other inventory items present complex problems of computer engineering, relating for example to the type of image data to be processed, what processing of the image data to perform, and how to determine actions from the image data with high reliability.

Other aspects and advantages of the present invention can be seen on review of the drawings, the detailed description and the claims, which follow.

BRIEF DESCRIPTION OF THE DRAWINGS

FIG. 4 shows an example data structure for storing joints information of subjects.

FIG. 5 is an example data structure for storing a subject including the information of associated joints.

FIG. 7 shows an example of a log data structure which can be used to store shopping cart of a subject or inventory items stocked on a shelf or in a shopping store.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

A system and various implementations of the subject technology is described with reference to FIGS. 1-11. The system and processes are described with reference to FIG. 1, an architectural level schematic of a system in accordance with an implementation. Because FIG. 1 is an architectural diagram, certain details are omitted to improve the clarity of the description.

Figure 1:
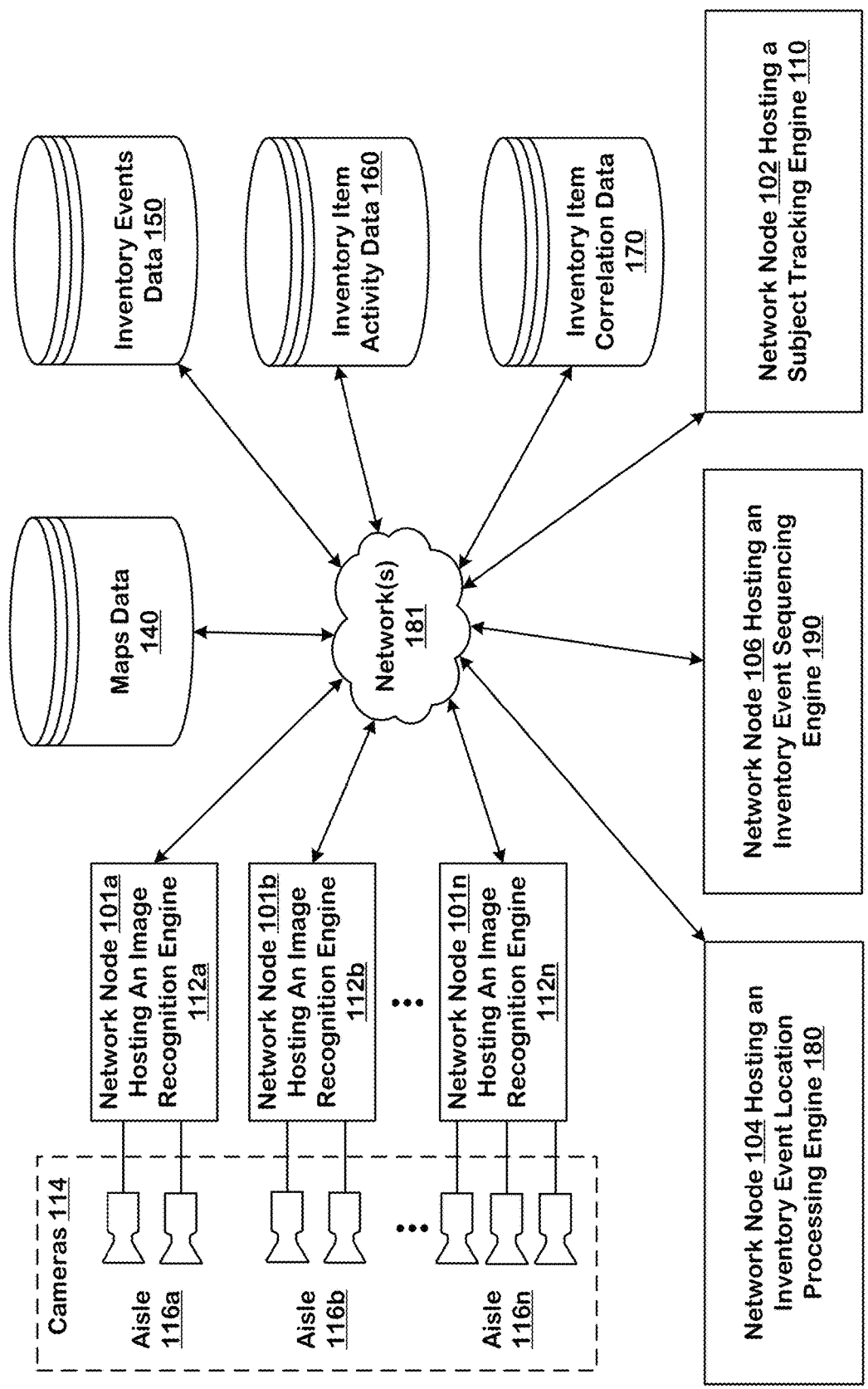
FIG. 1 illustrates an architectural level schematic of a system in which an inventory event location processing engine and an inventory event sequencing engine track inventory items in an area of real space.

The discussion of FIG. 1 is organized as follows. First, the elements of the system are described, followed by their interconnections. Then, the use of the elements in the system is described in greater detail. In examples described herein, cameras are used as sensors producing image frames which output color images in for example an RGB color space. In all of the disclosed embodiments, other types of sensors or combinations of sensors of various types can be used to produce image frames usable with or in place of the cameras, including image sensors working in other color spaces, infrared image sensors, UV image sensors, ultrasound image sensors, LIDAR based sensors, radar based sensors and so on.

FIG. 1 provides a block diagram level illustration of a system 100. The system 100 includes cameras 114, network nodes hosting image recognition engines 112a, 112b, and 112n, an inventory event location processing engine 180 deployed in a network node 104 (or nodes) on the network, an inventory event sequencing engine 190 deployed in a network node 106 (or nodes) on the network, a network node 102 hosting a subject tracking engine 110, a maps database 140, an inventory events database 150, an inventory item activity database 160, an inventory item correlation database 170, and a communication network or networks 181. The network nodes can host only one image recognition engine, or several image recognition engines. The system can also include a subject database and other supporting data.

As used herein, a network node is an addressable hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system. More than one virtual device configured as a network node can be implemented using a single physical device.

For the sake of clarity, only three network nodes hosting image recognition engines are shown in the system 100. However, any number of network nodes hosting image recognition engines can be connected to the subject tracking engine 110 through the network(s) 181. Similarly, the image recognition engine, the subject tracking engine, the inventory event location processing engine, the inventory event sequencing engine and other processing engines described herein can execute using more than one network node in a distributed architecture.

The interconnection of the elements of system 100 will now be described. Network(s) 181 couples the network nodes 101a, 101b, and 101n, respectively, hosting image recognition engines 112a, 112b, and 112n, the network node 104 hosting the inventory event location processing engine 180, the network node 106 hosting the inventory event sequencing engine 190, the network node 102 hosting the subject tracking engine 110, the maps database 140, the inventory events database 150, the inventory item activity database 160, and inventory item correlation database 170. Cameras 114 are connected to the subject tracking engine 110 through network nodes hosting image recognition engines 112a, 112b, and 112n. In one embodiment, the cameras 114 are installed in a shopping store such that sets of cameras 114 (two or more) with overlapping fields of view are positioned over each aisle to capture image frames of real space in the store. In FIG. 1, two cameras are arranged over aisle 116a, two cameras are arranged over aisle 116b, and three cameras are arranged over aisle 116n. The cameras 114 are installed over aisles with overlapping fields of view. In such an embodiment, the cameras are configured with the goal that customers moving in the aisles of the shopping store are present in the field of view of two or more cameras at any moment in time.

Cameras 114 can be synchronized in time with each other, so that image frames are captured at the same time, or close in time, and at the same image capture rate. The cameras 114 can send respective continuous streams of image frames at a predetermined rate to network nodes hosting image recognition engines 112a-112n. Image frames captured in all the cameras covering an area of real space at the same time, or close in time, are synchronized in the sense that the synchronized image frames can be identified in the processing engines as representing different views of subjects having fixed positions in the real space. For example, in one embodiment, the cameras send image frames at the rates of 30 frames per second (fps) to respective network nodes hosting image recognition engines 112a-112n. Each frame has a timestamp, identity of the camera (abbreviated as "camera_id"), and a frame identity (abbreviated as "frame_id") along with the image data. Other embodiments of the technology disclosed can use different types of sensors such as image sensors, LIDAR based sensors, etc., in place of cameras to generate this data. In one embodiment, sensors can be used in addition to the cameras 114. Multiple sensors can be synchronized in time with each other, so that frames are captured by the sensors at the same time, or close in time, and at the same frame capture rate.

Cameras installed over an aisle are connected to respective image recognition engines. For example, in FIG. 1, the two cameras installed over the aisle 116a are connected to the network node 101a hosting an image recognition engine 112a. Likewise, the two cameras installed over aisle 116b are connected to the network node 101b hosting an image recognition engine 112b. Each image recognition engine 112a-112n hosted in a network node or nodes 101a-101n, separately processes the image frames received from one camera each in the illustrated example.

In one embodiment, each image recognition engine 112a, 112b, and 112n is implemented as a deep learning algorithm such as a convolutional neural network (abbreviated CNN). In such an embodiment, the CNN is trained using training database. In an embodiment described herein, image recognition of subjects in the real space is based on identifying and grouping joints recognizable in the image frames, where the groups of joints can be attributed to an individual subject. For this joints-based analysis, the training database has a large collection of images for each of the different types of joints for subjects. In the example embodiment of a shopping store, the subjects are the customers moving in the aisles between the shelves. In an example embodiment, during training of the CNN, the system 100 is referred to as a "training system." After training the CNN using the training database, the CNN is switched to production mode to process images of customers in the shopping store in real time.

In an example embodiment, during production, the system 100 is referred to as a runtime system (also referred to as an inference system). The CNN in each image recognition engine produces arrays of joints data structures for image frames in its respective stream of image frames. In an embodiment as described herein, an array of joints data structures is produced for each processed image, so that each image recognition engine 112a-112n produces an output stream of arrays of joints data structures. These arrays of joints data structures from cameras having overlapping fields of view are further processed to form groups of joints, and to identify such groups of joints as subjects. The subjects can be identified and tracked by the system using an identifier "subject_id" during their presence in the area of real space.

The subject tracking engine 110, hosted on the network node 102 receives, in this example, continuous streams of arrays of joints data structures for the subjects from image recognition engines 112a-112n. The subject tracking engine 110 processes the arrays of joints data structures and translates the coordinates of the elements in the arrays of joints data structures corresponding to image frames in different sequences into candidate joints having coordinates in the real space. For each set of synchronized image frames, the combination of candidate joints identified throughout the real space can be considered, for the purposes of analogy, to be like a galaxy of candidate joints. For each succeeding point in time, movement of the candidate joints is recorded so that the galaxy changes over time. The output of the subject tracking engine 110 identifies subjects in the area of real space at a moment in time.

The subject tracking engine 110 uses logic to identify groups or sets of candidate joints having coordinates in real space as subjects in the real space. For the purposes of analogy, each set of candidate points is like a constellation of candidate joints at each point in time. The constellations of candidate joints can move over time. A time sequence analysis of the output of the subject tracking engine 110 over a period of time identifies movements of subjects in the area of real space.

In an example embodiment, the logic to identify sets of candidate joints comprises heuristic functions based on physical relationships amongst joints of subjects in real space. These heuristic functions are used to identify sets of candidate joints as subjects. The sets of candidate joints comprise individual candidate joints that have relationships according to the heuristic parameters with other individual candidate joints and subsets of candidate joints in a given set that has been identified, or can be identified, as an individual subject.

In the example of a shopping store the customers (also referred to as subjects above) move in the aisles and in open spaces. The customers take items from inventory locations on shelves in inventory display structures. In one example of inventory display structures, shelves are arranged at different levels (or heights) from the floor and inventory items are stocked on the shelves. The shelves can be fixed to a wall or placed as freestanding shelves forming aisles in the shopping store. Other examples of inventory display structures include, pegboard shelves, magazine shelves, lazy susan shelves, warehouse shelves, and refrigerated shelving units. The inventory items can also be stocked in other types of inventory display structures such as stacking wire baskets, dump bins, etc. The customers can also put items back on the same shelves from where they were taken or on another shelf.

The technology disclosed uses the sequences of image frames produced by cameras in the plurality of cameras to identify gestures by detected subjects in the area of real space over a period of time and produce inventory events including data representing identified gestures. The system includes logic to store the inventory events as entries in the inventory events database 150. The inventory event includes a subject identifier identifying a detected subject, a gesture type (e.g., a put or a take) of the identified gesture by the detected subject, an item identifier identifying an inventory item linked to the gesture by the detected subject, a location of the gesture represented by positions in three dimensions of the area of real space and a timestamp for the gesture. The inventory event data is stored as entries in the inventory events database 150.

The technology disclosed generates for a particular inventory item correlations to data sets related to the particular inventory item. The system includes inventory event location processing engine 180 (hosted on the network node 104) that determines a data set which includes inventory events for the particular inventory item in multiple locations in the area of real space. This activity data can provide different types of information related to the inventory item at multiple locations in the area of real space. In the example of a shopping store, the activity data can identify the counts of inventory events including the particular inventory item in multiple locations in a selected period of time such as an hour, a day or a week. Other examples of activity data includes percentages of inventory events including the particular inventory item at multiple locations or levels relative to a threshold count of inventory events including the particular item in multiple locations. Such information is useful for the store management to determine locations in the store from where the particular inventory item is being purchased in higher numbers. The output from the inventory event location processing engine 180 is stored in inventory item activity database 160.

The system includes inventory event sequencing engine 190 that uses the inventory events data and selects for a subject (such as a customer or a shopper in the shopping store) a temporally ordered sequence of inventory events leading to a particular inventory event including a particular inventory item. The inventory event sequencing engine 190 determines a data set including inventory items in the temporally ordered sequence of inventory events within a period of time prior to the particular inventory event. Multiple such data sets are determined for multiple subjects. This data can be generated over a period of time and across different shopping stores. The inventory event sequencing engine 190 stores the data sets in the inventory item correlation database 170. This data is analyzed to correlate the particular inventory item of a plurality of data sets with other inventory items in the plurality of data sets. The correlation can identify relationship of the particular inventory item with other inventory items, such as the items purchased together or items considered as alternative to the particular inventory item and not purchased by the shopper.

In one embodiment, the image analysis is anonymous, i.e., a unique identifier assigned to a subject created through joints analysis does not identify personal identification details (such as names, email addresses, mailing addresses, credit card numbers, bank account numbers, driver's license number, etc.) of any specific subject in the real space The data stored in the inventory events database 150, inventory item activity database 160, and the inventory item correlation database 170 does not include any personal identification information. The operations of the inventory event location processing engine 180 and the inventory event sequencing engine 190 do not use any personal identification including biometric information associated with the subjects.

The actual communication path to the network nodes 104 hosting the inventory event location processing engine 180 and the network node 106 hosting the inventory event sequencing engine 190 through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Camera Arrangement

The cameras 114 are arranged to track multi-joint subjects (or entities) in a three dimensional (abbreviated as 3D) real space. In the example embodiment of the shopping store, the real space can include the area of the shopping store where items for sale are stacked in shelves. A point in the real space can be represented by an (x, y, z) coordinate system. Each point in the area of real space for which the system is deployed is covered by the fields of view of two or more cameras 114.

Figure 2A:
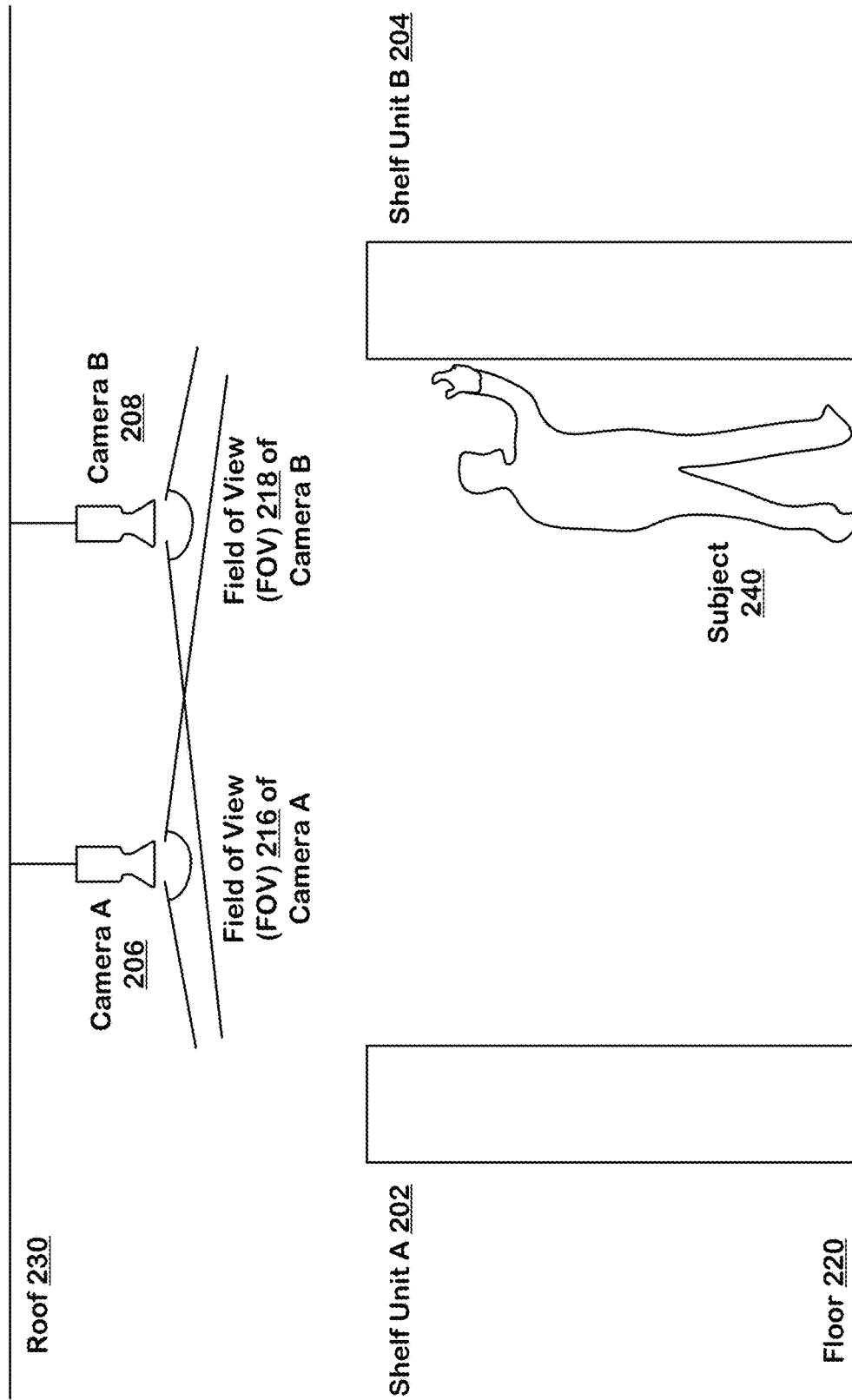
FIG. 2A is a side view of an aisle in a shopping store illustrating a subject, inventory display structures and a camera arrangement in a shopping store.

In a shopping store, the shelves and other inventory display structures can be arranged in a variety of manners, such as along the walls of the shopping store, or in rows forming aisles or a combination of the two arrangements. FIG. 2A shows an arrangement of shelf unit A 202 and shelf unit B 204, forming an aisle 116a, viewed from one end of the aisle 116a. Two cameras, camera A 206 and camera B 208 are positioned over the aisle 116a at a predetermined distance from a roof 230 and a floor 220 of the shopping store above the inventory display structures, such as shelf units A 202 and shelf unit B 204. The cameras 114 comprise cameras disposed over and having fields of view encompassing respective parts of the inventory display structures and floor area in the real space. The field of view 216 of the camera A 206 and the field of view 218 of the camera B 208 overlap with each other as shown in the FIG. 2A. The coordinates in real space of members of a set of candidate joints, identified as a subject, identify locations of the subject in the floor area.

In the example embodiment of the shopping store, the real space can include all of the floor 220 in the shopping store. Cameras 114 are placed and oriented such that areas of the floor 220 and shelves can be seen by at least two cameras. The cameras 114 also cover floor space in front of the shelves 202 and 204. Camera angles are selected to have both steep perspective, straight down, and angled perspectives that give more full body images of the customers. In one example embodiment, the cameras 114 are configured at an eight (8) foot height or higher throughout the shopping store.

Figure 2B:
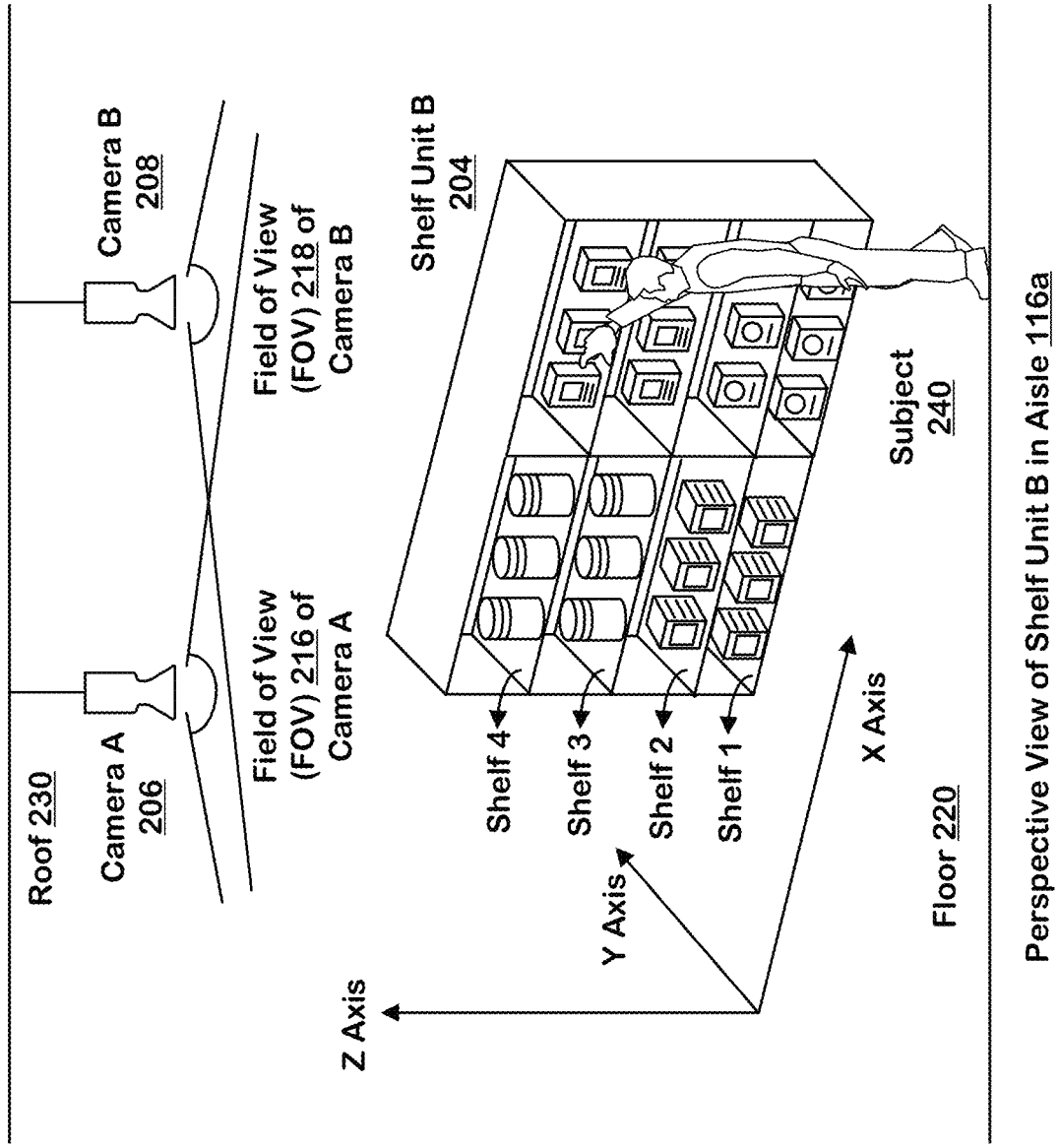
FIG. 2B is a perspective view of an inventory display structure in the aisle in FIG. 2A, illustrating a subject taking an item from a shelf in the inventory display structure.

In FIG. 2A, a subject 240 is standing by an inventory display structure shelf unit B 204, with one hand positioned close to a shelf (not visible) in the shelf unit B 204. FIG. 2B is a perspective view of the shelf unit B 204 with four shelves, shelf 1, shelf 2, shelf 3, and shelf 4 positioned at different levels from the floor. The inventory items are stocked on the shelves.

Three Dimensional Scene Generation

A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration. The system combines 2D image frames from two or cameras to generate the three-dimensional positions of joints and inventory events (indicating puts and takes of items from shelves) in the area of real space. This section presents a description of the process to generate 3D coordinates of joints and inventory events. The process is an example of 3D scene generation.

Before using the system 100 in training or inference mode to track the inventory items, two types of camera calibrations: internal and external, are performed. In internal calibration, the internal parameters of the cameras 114 are calibrated. Examples of internal camera parameters include focal length, principal point, skew, fisheye coefficients, etc. A variety of techniques for internal camera calibration can be used. One such technique is presented by Zhang in "A flexible new technique for camera calibration" published in IEEE Transactions on Pattern Analysis and Machine Intelligence, Volume 22, No. 11, November 2000.

In external calibration, the external camera parameters are calibrated in order to generate mapping parameters for translating the 2D image data into 3D coordinates in real space. In one embodiment, one multi-joint subject, such as a person, is introduced into the real space. The multi-joint subject moves through the real space on a path that passes through the field of view of each of the cameras 114. At any given point in the real space, the multi-joint subject is present in the fields of view of at least two cameras forming a 3D scene. The two cameras, however, have a different view of the same 3D scene in their respective two-dimensional (2D) image planes. A feature in the 3D scene such as a left-wrist of the multi-joint subject is viewed by two cameras at different positions in their respective 2D image planes.

A point correspondence is established between every pair of cameras with overlapping fields of view for a given scene. Since each camera has a different view of the same 3D scene, a point correspondence is two pixel locations (one location from each camera with overlapping field of view) that represent the projection of the same point in the 3D scene. Many point correspondences are identified for each 3D scene using the results of the image recognition engines 112a to 112n for the purposes of the external calibration. The image recognition engines identify the position of a joint as (x, y) coordinates, such as row and column numbers, of pixels in the 2D image planes of respective cameras 114. In one embodiment, a joint is one of 19 different types of joints of the multi-joint subject. As the multi-joint subject moves through the fields of view of different cameras, the tracking engine 110 receives (x, y) coordinates of each of the 19 different types of joints of the multi-joint subject used for the calibration from cameras 114 per image.

For example, consider an image from a camera A and an image from a camera B both taken at the same moment in time and with overlapping fields of view. There are pixels in an image from camera A that correspond to pixels in a synchronized image from camera B. Consider that there is a specific point of some object or surface in view of both camera A and camera B and that point is captured in a pixel of both image frames. In external camera calibration, a multitude of such points are identified and referred to as corresponding points. Since there is one multi-joint subject in the field of view of camera A and camera B during calibration, key joints of this multi-joint subject are identified, for example, the center of left wrist. If these key joints are visible in image frames from both camera A and camera B then it is assumed that these represent corresponding points. This process is repeated for many image frames to build up a large collection of corresponding points for all pairs of cameras with overlapping fields of view. In one embodiment, image frames are streamed off of all cameras at a rate of 30 FPS (frames per second) or more and a resolution of 720 pixels in full RGB (red, green, and blue) color. These image frames are in the form of one-dimensional arrays (also referred to as flat arrays).

The large number of image frames collected above for a multi-joint subject are used to determine corresponding points between cameras with overlapping fields of view. Consider two cameras A and B with overlapping field of view. The plane passing through camera centers of cameras A and B and the joint location (also referred to as feature point) in the 3D scene is called the "epipolar plane". The intersection of the epipolar plane with the 2D image planes of the cameras A and B defines the "epipolar line". Given these corresponding points, a transformation is determined that can accurately map a corresponding point from camera A to an epipolar line in camera B's field of view that is guaranteed to intersect the corresponding point in the image frame of camera B. Using the image frames collected above for a multi-joint subject, the transformation is generated. It is known in the art that this transformation is non-linear. The general form is furthermore known to require compensation for the radial distortion of each camera's lens, as well as the non-linear coordinate transformation moving to and from the projected space. In external camera calibration, an approximation to the ideal non-linear transformation is determined by solving a non-linear optimization problem. This non-linear optimization function is used by the subject tracking engine 110 to identify the same joints in outputs (arrays of joint data structures) of different image recognition engines 112a to 112n, processing image frames of cameras 114 with overlapping fields of view. The results of the internal and external camera calibration are stored in calibration database.

A variety of techniques for determining the relative positions of the points in image frames of cameras 114 in the real space can be used. For example, Longuet-Higgins published, "A computer algorithm for reconstructing a scene from two projections" in Nature, Volume 293, 10 Sep. 1981. This paper presents computing a three-dimensional structure of a scene from a correlated pair of perspective projections when spatial relationship between the two projections is unknown., Longuet-Higgins paper presents a technique to determine the position of each camera in the real space with respect to other cameras. Additionally, their technique allows triangulation of a multi-joint subject in the real space, identifying the value of the z-coordinate (height from the floor) using image frames from cameras 114 with overlapping fields of view. An arbitrary point in the real space, for example, the end of a shelf unit in one corner of the real space, is designated as a (0, 0, 0) point on the (x, y, z) coordinate system of the real space.

In an embodiment of the technology, the parameters of the external calibration are stored in two data structures. The first data structure stores intrinsic parameters. The intrinsic parameters represent a projective transformation from the 3D coordinates into 2D image coordinates. The first data structure contains intrinsic parameters per camera as shown below. The data values are all numeric floating point numbers. This data structure stores a 3×3 intrinsic matrix, represented as "K" and distortion coefficients. The distortion coefficients include six radial distortion coefficients and two tangential distortion coefficients. Radial distortion occurs when light rays bend more near the edges of a lens than they do at its optical center. Tangential distortion occurs when the lens and the image plane are not parallel. The following data structure shows values for the first camera only. Similar data is stored for all the cameras 114.

```
{
  1: {
    K: [[x, x, x], [x, x, x], [x, x, x]],
    distortion_coefficients: [x, x, x, x, x, x, x, x]
  },
}
```

The second data structure stores per pair of cameras: a 3×3 fundamental matrix (F), a 3×3 essential matrix (E), a 3×4 projection matrix (P), a 3×3 rotation matrix (R) and a 3×1 translation vector (t). This data is used to convert points in one camera's reference frame to another camera's reference frame. For each pair of cameras, eight homography coefficients are also stored to map the plane of the floor 220 from one camera to another. A fundamental matrix is a relationship between two image frames of the same scene that constrains where the projection of points from the scene can occur in both image frames. Essential matrix is also a relationship between two image frames of the same scene with the condition that the cameras are calibrated. The projection matrix gives a vector space projection from 3D real space to a subspace. The rotation matrix is used to perform a rotation in Euclidean space. Translation vector "t" represents a geometric transformation that moves every point of a figure or a space by the same distance in a given direction. The homography_floor_coefficients are used to combine image frames of features of subjects on the floor 220 viewed by cameras with overlapping fields of views. The second data structure is shown below. Similar data is stored for all pairs of cameras. As indicated previously, the x's represents numeric floating point numbers.

```
{
  1: {
    2: {
      F: [[x, x, x], [x, x, x], [x, x, x]],
      E: [[x, x, x], [x, x, x], [x, x, x]],
      P: [[x, x, x, x], [x, x, x, x], [x, x, x, x]],
      R: [[x, x, x], [x, x, x], [x, x, x]],
      t: [x, x, x],
      homography_floor_coefficients: [x, x, x, x, x, x, x, x]
    }
  },
  .......
}
```

Two Dimensional and Three Dimensional Maps

Figure 3:
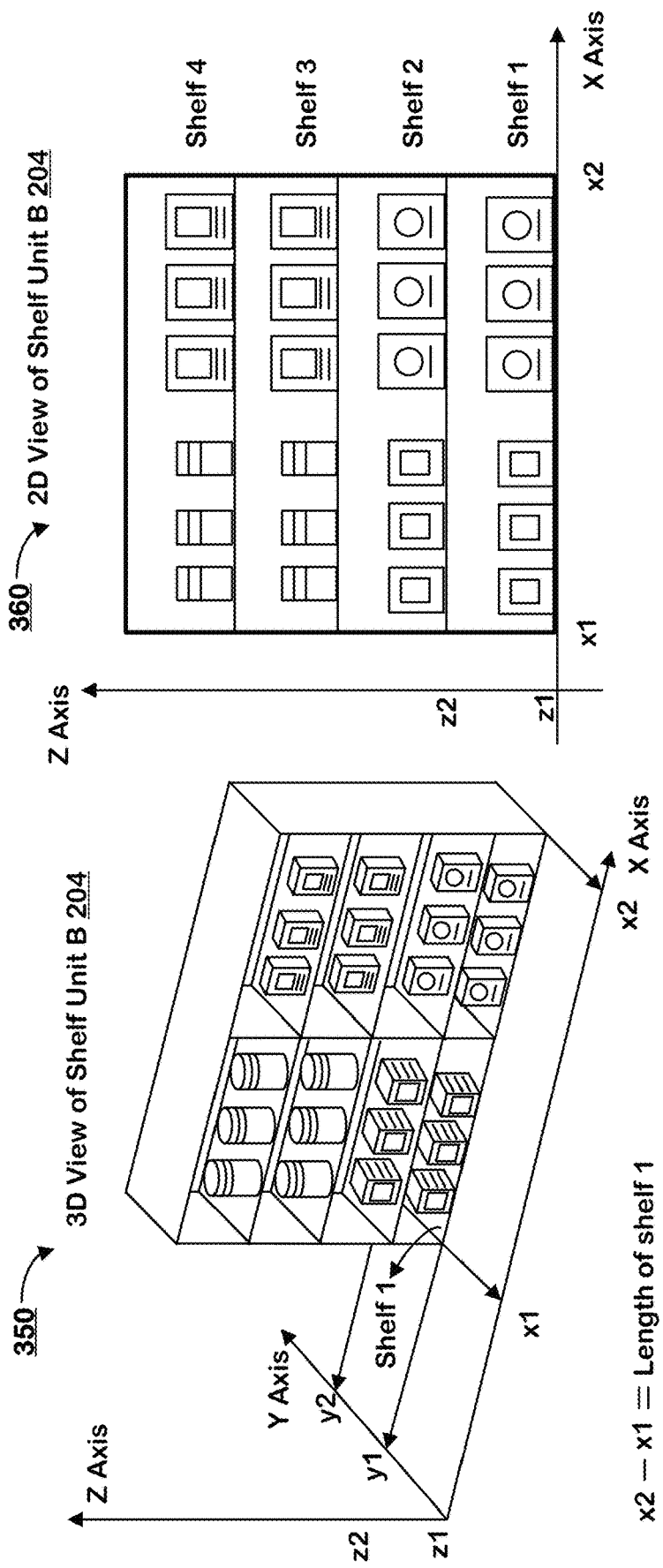
FIG. 3 shows examples of 2D and 3D maps of a shelf in an inventory display structure.

An inventory location, such as a shelf, in a shopping store can be identified by a unique identifier (e.g., shelf_id). Similarly, a shopping store can also be identified by a unique identifier (e.g., store_id). The two-dimensional (2D) and three dimensional (3D) maps database 140 identifies inventory locations in the area of real space along the respective coordinates. For example, in a 2D map, the locations in the maps define two dimensional regions on the plane formed perpendicular to the floor 220 i.e., XZ plane as shown in FIG. 3. The map defines an area for inventory locations where inventory items are positioned. In FIG. 3, a 2D view 360 of shelf 1 in shelf unit B 204 shows an area formed by four coordinate positions (x1, z1), (x1, z2), (x2, z2), and (x2, z1) defines a 2D region in which inventory items are positioned on the shelf 1. Similar 2D areas are defined for all inventory locations in all shelf units (or other inventory display structures) in the shopping store. This information is stored in the maps database 140.

In a 3D map, the locations in the map define three dimensional regions in the 3D real space defined by X, Y, and Z coordinates. The map defines a volume for inventory locations where inventory items are positioned. In FIG. 3, a 3D view 350 of shelf 1 in shelf unit B 204 shows a volume formed by eight coordinate positions (x1, y1, z1), (x1, y1, z2), (x1, y2, z1), (x1, y2, z2), (x2, y1, z1), (x2, y1, z2), (x2, y2, z1), (x2, y2, z2) defines a 3D region in which inventory items are positioned on the shelf 1. Similar 3D regions are defined for inventory locations in all shelf units in the shopping store and stored as a 3D map of the real space (shopping store) in the maps database 140. The coordinate positions along the three axes can be used to calculate length, depth and height of the inventory locations as shown in FIG. 3.

In one embodiment, the map identifies a configuration of units of volume which correlate with portions of inventory locations on the inventory display structures in the area of real space. Each portion is defined by stating and ending positions along the three axes of the real space. Similar configuration of portions of inventory locations can also be generated using a 2D map of inventory locations dividing the front plan of the display structures.

The items in a shopping store are arranged in some embodiments according to a planogram which identifies the inventory locations (such as shelves) on which a particular item is planned to be placed. For example, as shown in an illustration 360 in FIG. 3, a left half portion of shelf 3 and shelf 4 are designated for an item (which is stocked in the form of cans).

The technology disclosed can calculate a "realogram" of the shopping store at any time "t" which is the real time map of locations of inventory items in the area of real space, which can be correlated in addition in some embodiments with inventory locations in the store. A realogram can be used to create a planogram by identifying inventory items and a position in the store, and mapping them to inventory locations. In an embodiment, the system or method can create a data set defining a plurality of cells having coordinates in the area of real space. The system or method can divide the real space into a data set defining a plurality of cells using the length of the cells along the coordinates of the real space as an input parameter. In one embodiment, the cells are represented as two dimensional grids having coordinates in the area of real space. For example, the cells can correlate with 2D grids (e.g. at 1 foot spacing) of front plan of inventory locations in shelf units (also referred to as inventory display structures). Each grid is defined by its starting and ending positions on the coordinates of the two dimensional plane such as x and z coordinates. This information is stored in maps database 140.

In another embodiment, the cells are represented as three dimensional (3D) grids having coordinates in the area of real space. In one example, the cells can correlate with volume on inventory locations (or portions of inventory locations) in shelf units in the shopping store. In this embodiment, the map of the real space identifies a configuration of units of volume which can correlate with portions of inventory locations on inventory display structures in the area of real space. This information is stored in maps database 140. The realogram of the shopping store indicates inventory items associated with inventory events matched by their locations to cells at any time t by using timestamps of the inventory events stored in the inventory events database 150.

The inventory event location processing engine 180 includes logic that matches the inventory events for the particular inventory item in multiple locations to cells in the data set defining the plurality of cells. The inventory event location processing system can further map the inventory events to inventory locations matched with the cells in the data set defining the plurality of cells having coordinates in the area of real space.

Joints Data Structure

The image recognition engines 112a-112n receive the sequences of image frames from cameras 114 and process image frames to generate corresponding arrays of joints data structures. The system includes processing logic that uses the sequences of image frames produced by the plurality of camera to track locations of a plurality of subjects (or customers in the shopping store) in the area of real space. In one embodiment, the image recognition engines 112a-112n identify one of the 19 possible joints of a subject at each element of the image, usable to identify subjects in the area who may be taking and putting inventory items. The possible joints can be grouped in two categories: foot joints and non-foot joints. The 19$^{th}$ type of joint classification is for all non-joint features of the subject (i.e. elements of the image not classified as a joint). In other embodiments, the image recognition engine may be configured to identify the locations of hands specifically. Also, other techniques, such as a user check-in procedure or biometric identification processes, may be deployed for the purposes of identifying the subjects and linking the subjects with detected locations of their hands as they move throughout the store.

Foot Joints:
    Ankle joint (left and right)
Non-foot Joints:
    Neck
    Nose
    Eyes (left and right)

Ears (left and right)
Shoulders (left and right)
Elbows (left and right)
Wrists (left and right)
Hip (left and right)
Knees (left and right)
Not a joint An array of joints data structures for a particular image classifies elements of the particular image by joint type, time of the particular image, and the coordinates of the elements in the particular image. In one embodiment, the image recognition engines 112a-112n are convolutional neural networks (CNN), the joint type is one of the 19 types of joints of the subjects, the time of the particular image is the timestamp of the image generated by the source camera 114 for the particular image, and the coordinates (x, y) identify the position of the element on a 2D image plane.

The output of the CNN is a matrix of confidence arrays for each image per camera. The matrix of confidence arrays is transformed into an array of joints data structures. A joints data structure 400 as shown in FIG. 4 is used to store the information of each joint. The joints data structure 400 identifies x and y positions of the element in the particular image in the 2D image space of the camera from which the image is received. A joint number identifies the type of joint identified. For example, in one embodiment, the values range from 1 to 19. A value of 1 indicates that the joint is a left ankle, a value of 2 indicates the joint is a right ankle and so on. The type of joint is selected using the confidence array for that element in the output matrix of CNN. For example, in one embodiment, if the value corresponding to the left-ankle joint is highest in the confidence array for that image element, then the value of the joint number is "1".

A confidence number indicates the degree of confidence of the CNN in predicting that joint. If the value of confidence number is high, it means the CNN is confident in its prediction. An integer-Id is assigned to the joints data structure to uniquely identify it. Following the above mapping, the output matrix of confidence arrays per image is converted into an array of joints data structures for each image. In one embodiment, the joints analysis includes performing a combination of k-nearest neighbors, mixture of Gaussians, and various image morphology transformations on each input image. The result comprises arrays of joints data structures which can be stored in the form of a bit mask in a ring buffer that maps image numbers to bit masks at each moment in time.

Subject Tracking Engine

The tracking engine 110 is configured to receive arrays of joints data structures generated by the image recognition engines 112a-112n corresponding to image frames in sequences of image frames from cameras having overlapping fields of view. The arrays of joints data structures per image are sent by image recognition engines 112a-112n to the tracking engine 110 via the network(s) 181. The tracking engine 110 translates the coordinates of the elements in the arrays of joints data structures corresponding to image frames in different sequences into candidate joints having coordinates in the real space. A location in the real space is covered by the field of views of two or more cameras. The tracking engine 110 comprises logic to detect sets of candidate joints having coordinates in real space (constellations of joints) as subjects in the real space. In one embodiment, the tracking engine 110 accumulates arrays of joints data structures from the image recognition engines for all the cameras at a given moment in time and stores this information as a dictionary in a subject database, to be used for identifying a constellation of candidate joints. The dictionary can be arranged in the form of key-value pairs, where keys are camera ids and values are arrays of joints data structures from the camera. In such an embodiment, this dictionary is used in heuristics-based analysis to determine candidate joints and for assignment of joints to subjects. In such an embodiment, a high-level input, processing and output of the tracking engine 110 is illustrated in table 1. Details of the logic applied by the subject tracking engine 110 to detect subjects by combining candidate joints and track movement of subjects in the area of real space are presented in U.S. Pat. No. 10,055,853, issued 21 Aug. 2018, titled, "Subject Identification and Tracking Using Image Recognition Engine" which is incorporated herein by reference. The detected subjects are assigned unique identifiers (such as "subject_id") to track them throughout their presence in the area of real space.

TABLE 1

Inputs, processing and outputs from subject tracking engine 110 in an example embodiment.

| Inputs | Processing | Output |
| --- | --- | --- |
| Arrays of joints data structures per image and for each joints data structure Unique ID Confidence number Joint number (x, y) position in image space | Create joints dictionary Reproject joint positions in the fields of view of cameras with overlapping fields of view to candidate joints | List of identified subjects in the real space at a moment in time |

Subject Data Structure

The subject tracking engine 110 uses heuristics to connect joints of subjects identified by the image recognition engines 112a-112n. In doing so, the subject tracking engine 110 detects new subjects and updates the locations of identified subjects (detected previously) by updating their respective joint locations. The subject tracking engine 110 uses triangulation techniques to project the locations of joints from 2D space coordinates (x, y) to 3D real space coordinates (x, y, z). FIG. 5 shows the subject data structure 500 used to store the subject. The subject data structure 500 stores the subject related data as a key-value dictionary. The key is a "frame_id" and the value is another key-value dictionary where key is the camera_id and value is a list of 18 joints (of the subject) with their locations in the real space. The subject data is stored in the subject database. Every new subject is also assigned a unique identifier that is used to access the subject's data in the subject database.

In one embodiment, the system identifies joints of a subject and creates a skeleton of the subject. The skeleton is projected into the real space indicating the position and orientation of the subject in the real space. This is also referred to as "pose estimation" in the field of machine vision. In one embodiment, the system displays orientations and positions of subjects in the real space on a graphical user interface (GUI). In one embodiment, the subject identification and image analysis are anonymous, i.e., a unique identifier assigned to a subject created through joints analysis does not identify personal identification information of the subject as described above.

For this embodiment, the joints constellation of an identified subject, produced by time sequence analysis of the joints data structures, can be used to locate the hand of the subject. For example, the location of a wrist joint alone, or a location based on a projection of a combination of a wrist joint with an elbow joint, can be used to identify the location of hand of an identified subject.

Inventory Events

Figure 6:
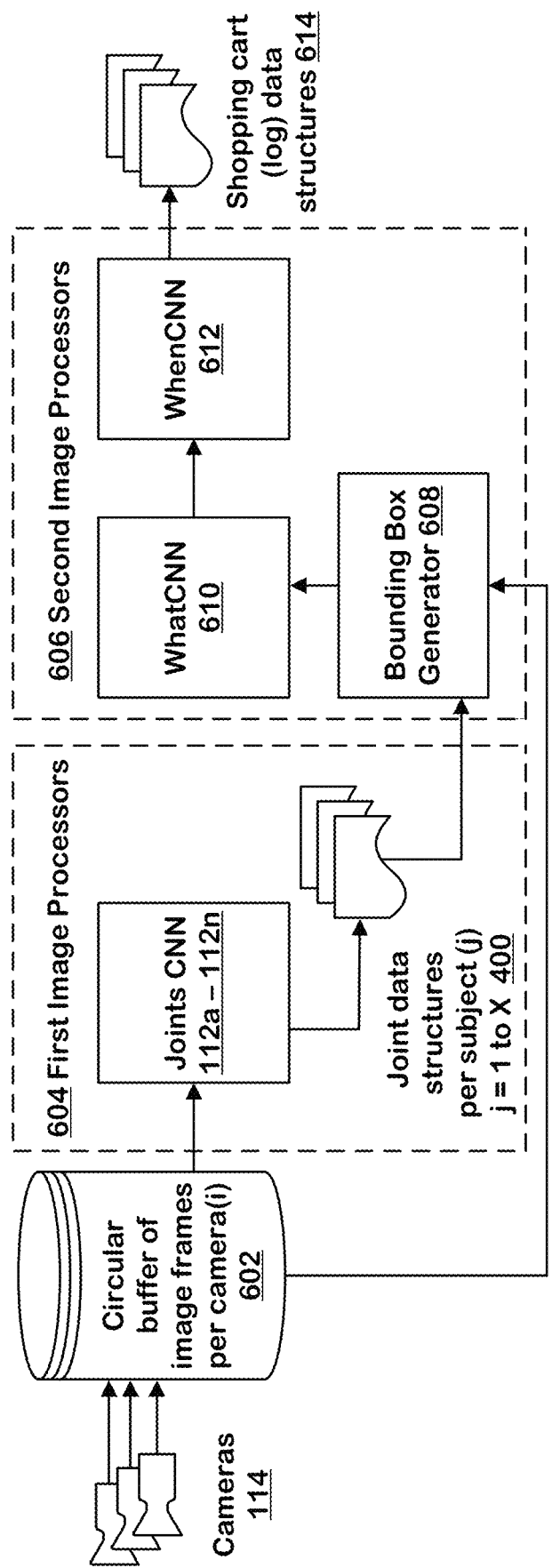
FIG. 6 is an example architecture of an image processing pipeline comprising first image processors and second image processors.

FIG. 6 presents subsystem components implementing the system for tracking changes by subjects in an area of real space. The system comprises of the plurality of cameras 114 producing respective sequences of image frames of corresponding fields of view in the real space. The field of view of each camera overlaps with the field of view of at least one other camera in the plurality of cameras as described above. In one embodiment, the sequences of image frames corresponding to the image frames produced by the plurality of cameras 114 are stored in a circular buffer 602 (also referred to as a ring buffer). Each image frame has a timestamp, identity of the camera (abbreviated as "camera_id"), and a frame identity (abbreviated as "frame_id") along with the image data. Circular buffer 602 store a set of consecutively timestamped image frames from respective cameras 114. In one embodiment, a separate circular buffer stores image frames per camera 114.

A first image processors 604 (also referred to as subject identification subsystem), includes first image recognition engines (also referred to as subject image recognition engines), receiving corresponding sequences of image frames from the plurality of cameras 114. The subject image recognition engines process image frames to generate first data sets that identify subjects and locations of subjects represented in the image frames in the corresponding sequences of image frames in the real space. In one embodiment, the subject image recognition engines are implemented as convolutional neural networks (CNNs) referred to as joints CNN 112a-112n. Joints of a single subject can appear in image frames of multiple cameras in a respective image channel. The outputs of joints CNNs 112a-112n corresponding to cameras with overlapping fields of view are combined to map the location of joints from 2D image coordinates of each camera to 3D coordinates of real space. The joints data structures 400 per subject (j) where j equals 1 to x, identify locations of joints of a subject (j) in the real space and in 2D space for each image. Some details of subject data structure 400 are presented in FIG. 4.

The second image processors 606 (also referred to as region proposals subsystem) include second image recognition engines (also referred to as foreground image recognition engines) receiving image frames from the sequences of image frames. The second image processors include logic to identify and classify foreground changes represented in the image frames in the corresponding sequences of image frames. The second image processors 606 include logic to process the first data sets (that identify subjects) to specify bounding boxes which include images of hands of the identified subjects in image frames in the sequences of image frames. As shown in FIG. 6, the subsystem 606 includes a bounding box generator 608, a WhatCNN 610 and a WhenCNN 612. The joint data structures 400 and image frames per camera from the circular buffer 602 are given as input to the bounding box generator 608. The bounding box generator 608 implements the logic to process the data sets to specify bounding boxes which include images of hands of identified subjects in image frames in the sequences of image frames. The bounding box generator identifies locations of hands in each source image frame per camera using for example, locations of wrist joints (for respective hands) and elbow joints in the multi-joints subject data structures 500 corresponding to the respective source image frame. In one embodiment, in which the coordinates of the joints in subject data structure indicate location of joints in 3D real space coordinates, the bounding box generator maps the joint locations from 3D real space coordinates to 2D image coordinates in the image frames of respective source images.

The bounding box generator 608 creates bounding boxes for hands in image frames in a circular buffer per camera 114. In one embodiment, the bounding box is a 128 pixels (width) by 128 pixels (height) portion of the image frame with the hand located in the center of the bounding box. In other embodiments, the size of the bounding box is 64 pixels×64 pixels or 32 pixels×32 pixels. For m subjects in an image frame from a camera, there can be a maximum of 2m hands, thus 2m bounding boxes. However, in practice fewer than 2m hands are visible in an image frame because of occlusions due to other subjects or other objects. In one example embodiment, the hand locations of subjects are inferred from locations of elbow and wrist joints. For example, the right hand location of a subject is extrapolated using the location of the right elbow (identified as p1) and the right wrist (identified as p2) as extrapolation_amount* (p2−p1)+p2 where extrapolation_amount equals 0.4. In another embodiment, the joints CNN 112a-112n are trained using left and right hand images. Therefore, in such an embodiment, the joints CNN 112a-112n directly identify locations of hands in image frames per camera. The hand locations per image frame are used by the bounding box generator to create a bounding box per identified hand.

In one embodiment, the WhatCNN and the WhenCNN models are implemented convolutional neural networks (CNN). WhatCNN is a convolutional neural network trained to process the specified bounding boxes in the image frames to generate a classification of hands of the identified subjects. One trained WhatCNN processes image frames from one camera. In the example embodiment of the shopping store, for each hand in each image frame, the WhatCNN identifies whether the hand is empty. The WhatCNN also identifies a SKU (stock keeping unit) number of the inventory item in the hand, a confidence value indicating the item in the hand is a non-SKU item (i.e. it does not belong to the shopping store inventory) and a context of the hand location in the image frame.

The outputs of WhatCNN models 610 for all cameras 114 are processed by a single WhenCNN model 612 for a pre-determined window of time. In the example of a shopping store, the WhenCNN performs time series analysis for both hands of subjects to identify gestures by detected subjects and produce inventory events. The inventory events are stored as entries in the inventory events database 150. The inventory events identify whether a subject took a store inventory item from a shelf or put a store inventory item on a shelf. The technology disclosed uses the sequences of image frames produced by at least two cameras in the plurality of cameras to find a location of an inventory event. The WhenCNN executes analysis of data sets from sequences of image frames from at least two cameras to determine locations of inventory events in three dimensions and to identify item associated with the inventory event. A time series analysis of the output of WhenCNN per subject over a period of time is performed to identify gestures and produce inventory events and their time of occurrence. A non-maximum suppression (NMS) algorithm is used for this purpose. As one inventory event (i.e. put or take of an item by a subject) is produced by WhenCNN multiple times (both from the same camera and from multiple cameras), the NMS removes superfluous events for a subject. NMS is a rescoring technique comprising two main tasks: "matching loss" that penalizes superfluous detections and "joint processing" of neighbors to know if there is a better detection close-by.

The true events of takes and puts for each subject are further processed by calculating an average of the SKU logits for 30 image frames prior to the image frame with the true event. Finally, the arguments of the maxima (abbreviated arg max or argmax) is used to determine the largest value. The inventory item classified by the argmax value is used to identify the inventory item put on the shelf or taken from the shelf. The technology disclosed attributes the inventory event to a subject by assigning the inventory item associated with the inventory to a log data structure 614 (or shopping cart data structure) of the subject. The inventory item is added to a log of SKUs (also referred to as shopping cart or basket) of respective subjects. The image frame identifier "frame_id," of the image frame which resulted in the inventory event detection is also stored with the identified SKU. The logic to attribute the inventory event to the customer matches the location of the inventory event to a location of one of the customers in the plurality of customers. For example, the image frame can be used to identify 3D position of the inventory event, represented by the position of the subject's hand in at least one point of time during the sequence that is classified as an inventory event using the subject data structure 500, which can be then used to determine the inventory location from where the item was taken from or put on. The technology disclosed uses the sequences of image frames produced by at least two cameras in the plurality of cameras to find a location of an inventory event and creates an inventory event data structure. In one embodiment, the inventory event data structure stores item identifier, a put or take indicator, coordinates in three dimensions of the area of real space and a time stamp. In one embodiment, the inventory events are stored as entries in the inventory events database 150.

The locations of inventory events (indicating puts and takes of inventory items by subjects in an area of space) can be compared with a planogram or other map of the store to identify an inventory location, such as a shelf, from which the subject has taken the item or placed the item on. In one embodiment, the determination of a shelf in a shelf unit is performed by calculating a shortest distance from the position of the hand associated with the inventory event. This determination of shelf is then used to update the inventory data structure of the shelf. An example inventory data structure 614 (also referred to as a log data structure) shown in FIG. 7. This inventory data structure stores the inventory of a subject, shelf or a store as a key-value dictionary. The key is the unique identifier of a subject, shelf or a store and the value is another key value-value dictionary where key is the item identifier such as a stock keeping unit (SKU) and the value is a number identifying the quantity of item along with the "frame_id" of the image frame that resulted in the inventory event prediction. The frame identifier ("frame_id") can be used to identify the image frame which resulted in identification of an inventory event resulting in association of the inventory item with the subject, shelf, or the store. In other embodiments, a "camera_id" identifying the source camera can also be stored in combination with the frame_id in the inventory data structure 614. In one embodiment, the "frame_id" is the subject identifier because the frame has the subject's hand in the bounding box. In other embodiments, other types of identifiers can be used to identify subjects such as a "subject_id" which explicitly identifies a subject in the area of real space.

When the shelf inventory data structure is consolidated with the subject's log data structure, the shelf inventory is reduced to reflect the quantity of item taken by the customer from the shelf. If the item was put on the shelf by a customer or an employee stocking items on the shelf, the items get added to the respective inventory locations' inventory data structures. Over a period of time, this processing results in updates to the shelf inventory data structures for all inventory locations in the shopping store. Inventory data structures of inventory locations in the area of real space are consolidated to update the inventory data structure of the area of real space indicating the total number of items of each SKU in the store at that moment in time. In one embodiment, such updates are performed after each inventory event. In another embodiment, the store inventory data structures is updated periodically.

Detailed implementation of the implementations of What-CNN and WhenCNN to detect inventory events is presented in U.S. Pat. No. 10,133,933, issued 20 Nov. 2018, titled, "Item Put and Take Detection Using Image Recognition" which is incorporated herein by reference as if fully set forth herein.

Inventory Item Correlations Analysis

Figure 8A:
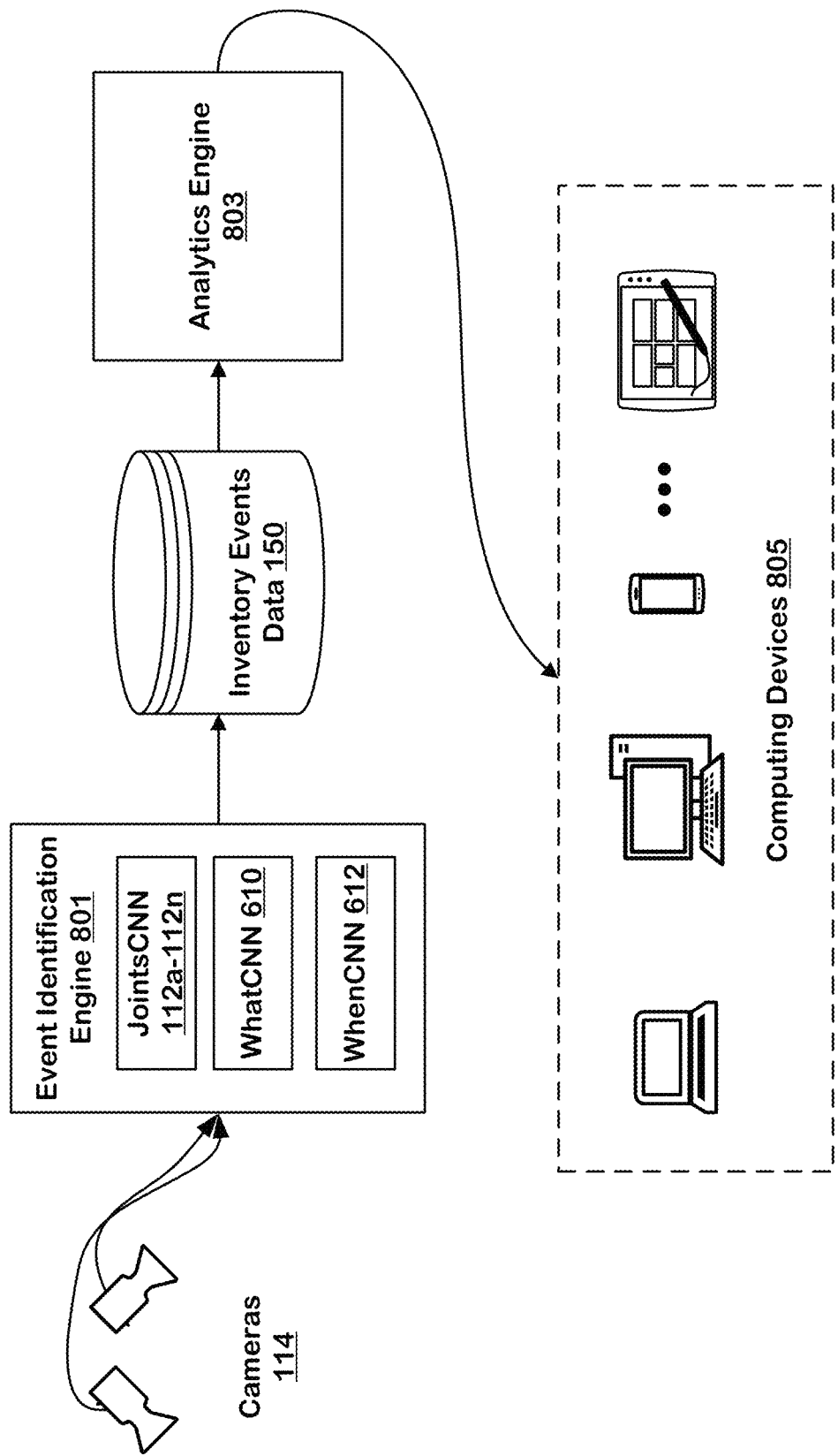
FIG. 8A is a high level architecture of a system comprising an event identification engine and an analytics engine to perform inventory item correlations analysis.

The inventory events data generated by the analysis of the sequences of image frames from cameras with overlapping field of views is used by an analytics engine to generate correlations of inventory items in space and time. FIG. 8A is a high level architecture of a system to perform inventory item correlation analysis. It comprises of cameras 114 producing sequencing of image frames that are processed by an event identification engine 801 and stored in the inventory database 150. In one embodiment the event identification engine comprises of JointsCNN 112a-112n, WhatCNN 610, and WhenCNN 612 to produce inventory events as described above. Other types of image analysis can be performed to generate the inventory events data. In another embodiment, the architecture includes a "semantic diffing" subsystem. The semantic subsystem can be used independently to produce the inventory events data or it can be used in parallel to the second image processors 606 to identify gestures by detected subjects and produce inventory events. This semantic diffing subsystem includes background image recognition engines, which receive corresponding sequences of image frames and recognize semantically significant differences in the background (i.e. inventory display structures like shelves) as they relate to puts and takes of inventory items, for example, over time in the image frames from each camera. The semantic diffing subsystem receives output of the subject identification subsystem 604 and image frames from cameras 114 as input. Details of "semantic diffing" subsystem are presented in U.S. Pat. No. 10,127,438, issued 13 Nov. 2018, titled, "Predicting Inventory Events using Semantic Diffing," and U.S. patent application Ser. No. 15/945,473, filed 4 Apr. 2018, titled, "Predicting Inventory Events using Foreground/Background Processing," both of which are incorporated herein by reference as if fully set forth herein.

The analytics engine 803 that includes logic that generates for a particular inventory item correlations to data sets related to the particular inventory item. Examples of data sets include inventory events for the particular inventory item in multiple locations in the area of real space or data sets including other inventory items in a temporally ordered sequence of inventory events prior to an inventory event including the particular inventory item. In one embodiment, the analytics engine generates graphical constructs with actionable data for these correlations. The graphical constructs are displayed on user interfaces of computing devices 805.

Inventory Item to Multiple Locations Correlation Analysis

Figure 8B:
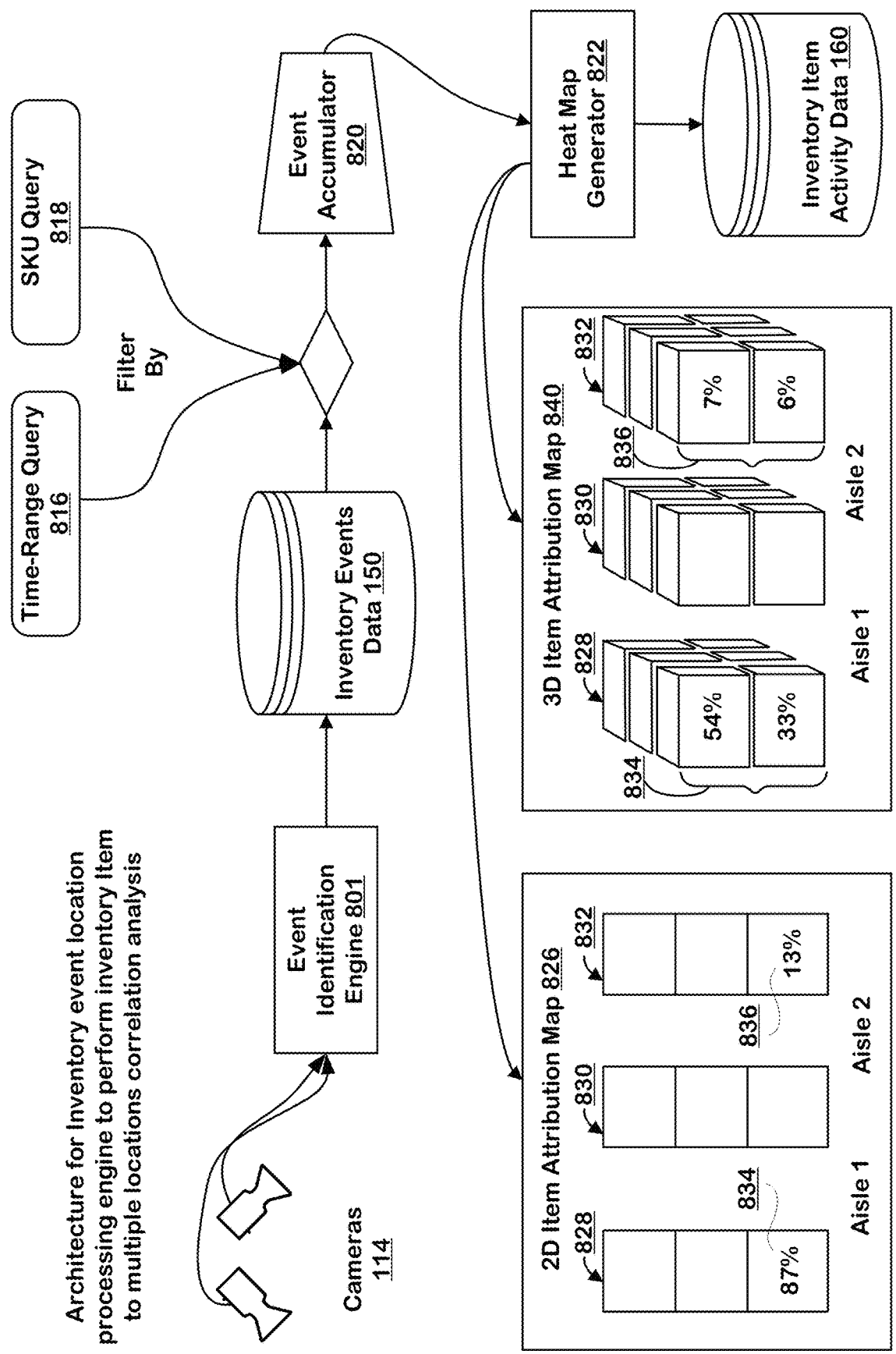
FIG. 8B is an example architecture which can be used to determine heat maps of inventory locations for an inventory item using inventory events related to the inventory item in the area of real space.

FIG. 8B presents an example architecture for inventory event location processing engine 180 for performing correlations analysis for an inventory item in multiple locations in the area of real space. The system includes logic that determines a data set including the inventory events for the particular inventory item in multiple locations in the area of real space. The system includes logic to display on user interface a graphical construct indicating activity related to the particular inventory item in the multiple locations. For this analysis, the inventory events are selected using a query 818 for a particular inventory item identified by a unique identifier such as a SKU (stock keeping unit). The inventory events for the particular inventory item are further selected for a period of time using a time-range query 816. The event accumulator 820 sends the selected data set of inventory events for the particular inventory item in multiple locations in the area of real space to a heat map generator 822. In one embodiment, the inventory event selection logic includes logic that selects inventory events that include the particular inventory item including a parameter that indicates the inventory item is sold to the identified subject.

The heat map generator 822 displays a graphical construct on user interface indicating activity related to the particular inventory item in the multiple locations. In one embodiment, the heat map generator creates clusters of inventory events using the positions of the inventory events in the three dimensions of the area of real space. For example, two inventory events are considered to belong to a same cluster if these are with a pre-defined Euclidean distance threshold (such as 3 feet). Known cluster analysis techniques such as k-means or DBSCAN can be applied to create clusters of inventory events. In one embodiment, the locations of centroid of the clusters are mapped to the area of real space to identify locations of activity related to the inventory item.

In one embodiment, as described above, in which a data set defining a plurality of cells having coordinates in the area of real space is available, the system includes logic that matches inventory events for the particular inventory item in multiple locations to cells in the data set defining the plurality of cells. In such an embodiment, the cells matching the inventory event locations, are used to present item-to-multiple-locations correlation data in the 2D and/or 3D item attribution maps. One or more cells can be combined at one location for illustration purposes. In one embodiment, the locations of inventory locations (such as shelves in inventory display structures) are available. In such an embodiment, the inventory display structure comprising inventory locations are matched with cells in the data set defining the plurality of cells having coordinates in the area of real space. The 2D and 3D locations of inventory locations in the area of real space are stored in the maps database 140 as described above. The heat map generator queries the maps database 140 to retrieve this information.

The system includes logic that matches cells to inventory locations and generates heat maps for inventory locations using the activity related to the particular inventory item in multiple locations. One example graphical construct is shown in the 2D item attribution map 826. The 2D item attribution map shows the activity related to the particular item in portions as a top view of inventory locations such as shelves. In FIG. 8B, a portion of the 2D map of the area of real space is shown as 2D item attribution map 826 for illustration purposes. The 2D item attribution map 826 shows a top view of inventory display structures 828, 830, and 832 comprising of shelves at different levels. The shelves at different levels are not visible in the 2D item attribution map. The map 826 shows that there are two locations 834 and 836 at which the activity occurred related to inventory item during the selected period of time.

The activity analysis can provide graphical illustrations to present this item to multiple locations correlation data. In one embodiment, the activity related to the particular inventory item includes percentages of total inventory events including the particular inventory item in the multiple locations in the period of time. The clusters indicating the item to multiple locations correlation data are mapped to 2D maps of inventory locations in the area of real space. In this embodiment, the activity of the inventory item in multiple locations 834 and 836 indicates that 87% percent of items are taken from location 834 and 13% of the items are taken from the inventory location 836. In another embodiment, the activity related to the particular inventory item includes counts of the inventory events including the particular inventory item in the multiple locations in the period of time. In yet another embodiment, the activity related to the particular item includes levels relative to a threshold count of inventory events including the particular inventory item in multiple locations in the period of time. In such an embodiment, when the level of inventory items at a location falls below the threshold level, a notification is sent to store employee to restock inventory items at that location.

The heat map generator 822 also generates a 3D item attribution map 840 illustrating the item to multiple locations correlation. In this embodiment, the item to multiple locations correlation data is mapped to 3D cells in the area of real space. The heat map generator uses the positions of the inventory events in the three coordinates of the area of real space to create clusters as described above. This graphical representation provides further details about inventory events. For example, in the 2D item attribution map shows the location 834 shows 87% percent of the items are taken from this location. In 3D item attribution map, the location 834 is further divided into two clusters (comprising one or more cells). The 3D graphical illustrations in the map 840 shows more items (54%) are taken from top shelves at location 834 than bottom shelves (33%). The 3D cells shown in the map 840 can match a single shelf or more than one shelf according to level of granularity desired. Similarly at location 836, the 3D item attribution map shows 7% of items are taken from the top level shelves as compared to 6% from bottom level shelves. The heat map generator stores the item attribution maps 826 and 840 in the inventory item activity database 160.

Figure 8C:
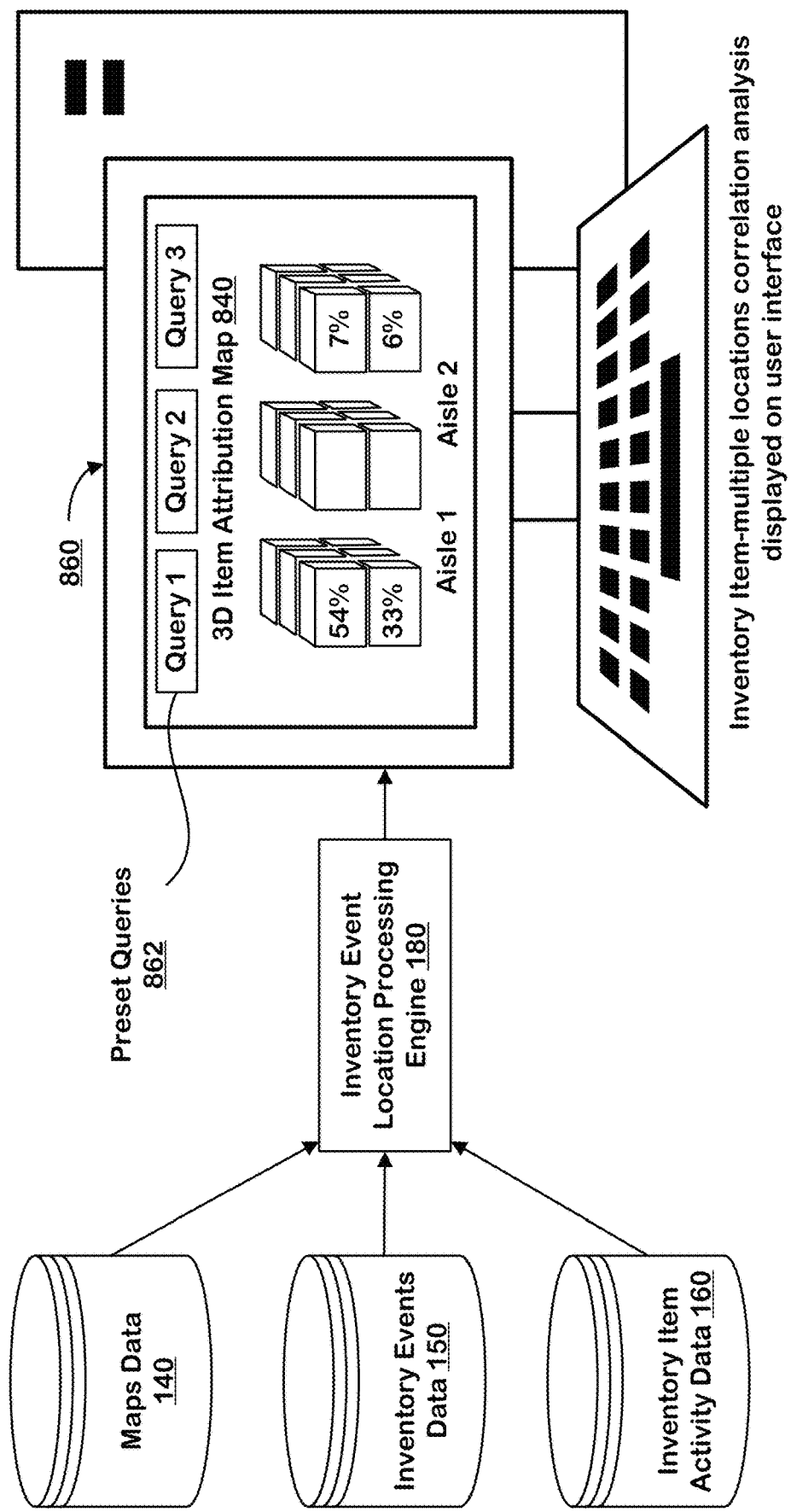
FIG. 8C is an example user interface displaying a 3D item attribution map for an inventory item in the area of real space.

FIG. 8C shows the 3D item attribution map 840 displayed on a graphical user interface 860 of a computing device. The user interface has a set of widgets 862 that correspond with preset queries to the database. An example of a preset query include retrieving the inventory locations from where a particular inventory item is taken by customers during a time interval such as one day or one week etc. Another example of a present query includes listing alternative considered items for a particular inventory item. It is understood that a variety of user interface designs can be implemented to present the preset queries to users. For example, a row of buttons (or widgets) on top of a page as shown in FIG. 8C. In another user interface design the buttons can be positioned on different pages of the user interface. Users of the system can also generate notifications to store employees, for example, to restock inventory items on the shelves. The data can be used for planning purposes such as identifying inventory locations from where most of the shoppers take a particular item. The store planogram can then be updated using this information to efficiently utilize space on inventory locations.

Inventory Item to Chronologically Related Items Correlations Analysis

Figure 9:
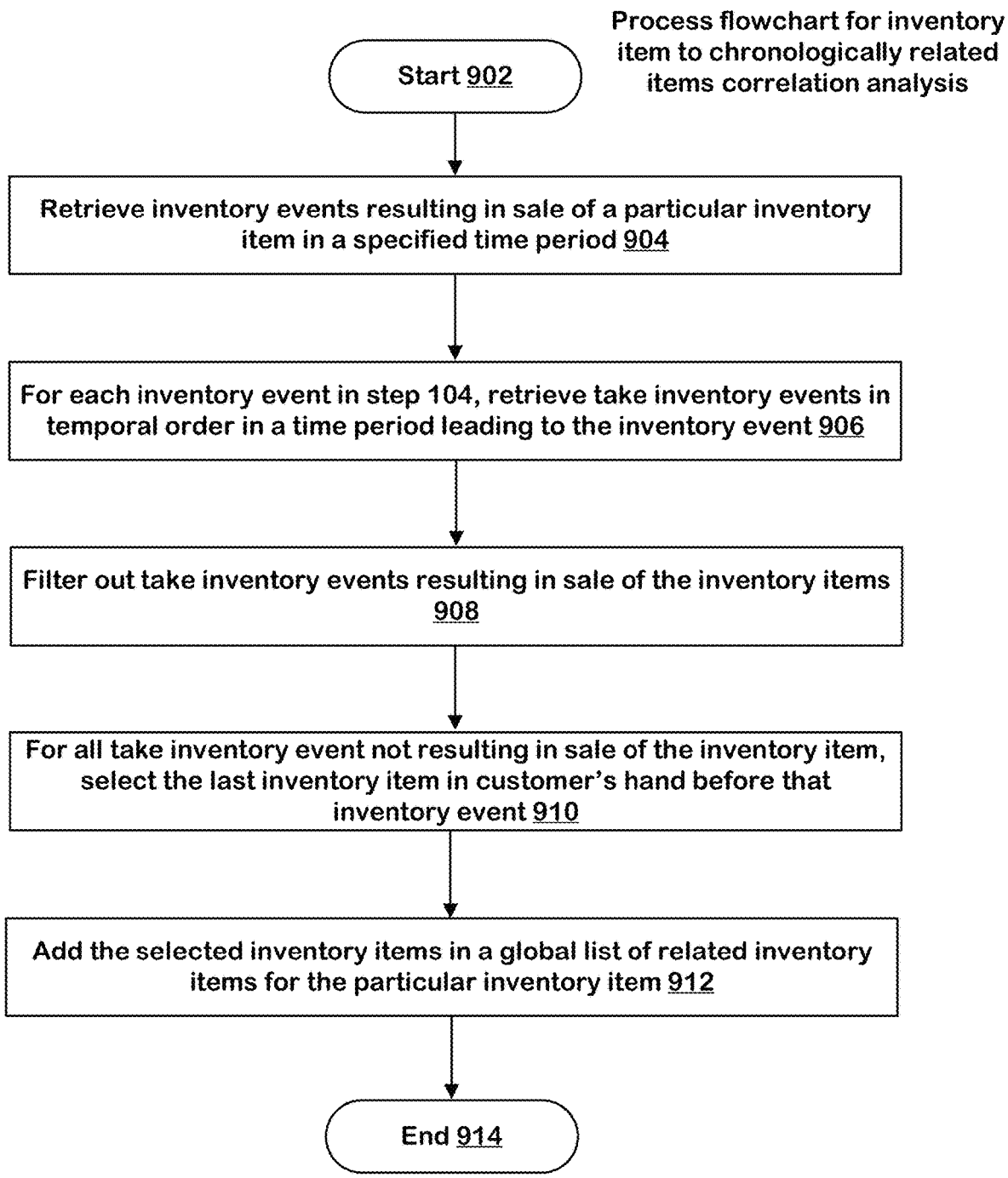
FIG. 9 is a flowchart showing process steps for performing inventory item to chronologically related inventory items correlation analysis.

Another example of a correlation analysis performed by the technology disclosed is to determine chronologically related inventory items to a particular inventory item by using the inventory events stored in the inventory events database 150. FIG. 9 presents a process flowchart to perform this correlation analysis. The logic can be implemented using processors, programmed using computer programs, stored in memory accessible and executable by the processors, and in other configurations, by dedicated logic hardware, including field programmable integrated circuits, and by combinations of dedicated logic hardware and computer programs. With all flowcharts herein, it will be appreciated that many of the steps can be combined, performed in parallel, or performed in a different sequence, without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the embodiments, and it will be understood that numerous additional steps for accomplishing other functions can be performed before, after and between those shown.

The process starts at step 902. At step 904 all inventory events that resulted in sale of a particular inventory item in a specified period of time are retrieved from the inventory events database 150, or at least one inventory event is retrieved. The time period can be defined as desired e.g., an hour, a day or a week. For each of the inventory event entry selected above, the technology disclosed selects for a subject identified in the inventory event, a temporally ordered sequence of inventory events leading to the particular inventory event including a particular inventory item (step 906). The processing system stores the temporally ordered sequence of inventory events in data sets including inventory items in the temporally ordered sequence of inventory events within a period of time. The time series data per data set does not require subject identification information to perform the correlation analysis to determine chronologically related items to the particular inventory item. In one embodiment, the data sets are filtered to keep only the "take" inventory events entries and filter out the "put" inventory events entries. At step 908, the "take" inventory events resulting in sale of inventory items are further filtered out from the data sets including inventory items in the temporally ordered sequence of inventory events leading to the particular inventory events including a particular inventory item.

The system includes logic to accumulate the plurality of data sets as described above. The system stores the accumulated data sets in a data structure. The data structure is configured for use to analyze the data to correlate the particular inventory item of a plurality of data sets with other inventory items in the plurality of data sets. In one embodiment, the data structure is used to determine alternative products considered by the shoppers before deciding to purchase particular inventory item. In one embodiment, this information is generated by selecting the inventory items in the data sets immediately preceding the particular inventory item (step 910) in the temporally ordered sequence of inventory events. In another embodiment, more than one preceding items in the temporally ordered sequence in each data set are selected as alternative considered products. Other embodiments can use different selection criteria to identify subset of inventory items each data set are selected for example, selecting events in a period of time preceding the inventory event including the particular inventory item. Additional selection criteria can be applied to determine alternative considered products, for example selecting inventory items within a same product category as the particular inventory item. Finally, the selected inventory items are stored in a global list of inventory items related to the particular inventory item (step 912). The list can include data from more than one store. The logic to determine related inventory items for a particular inventory item operates without the use of personal identifying biometric information associated with the subjects. The process ends at step 914.

Figure 10:
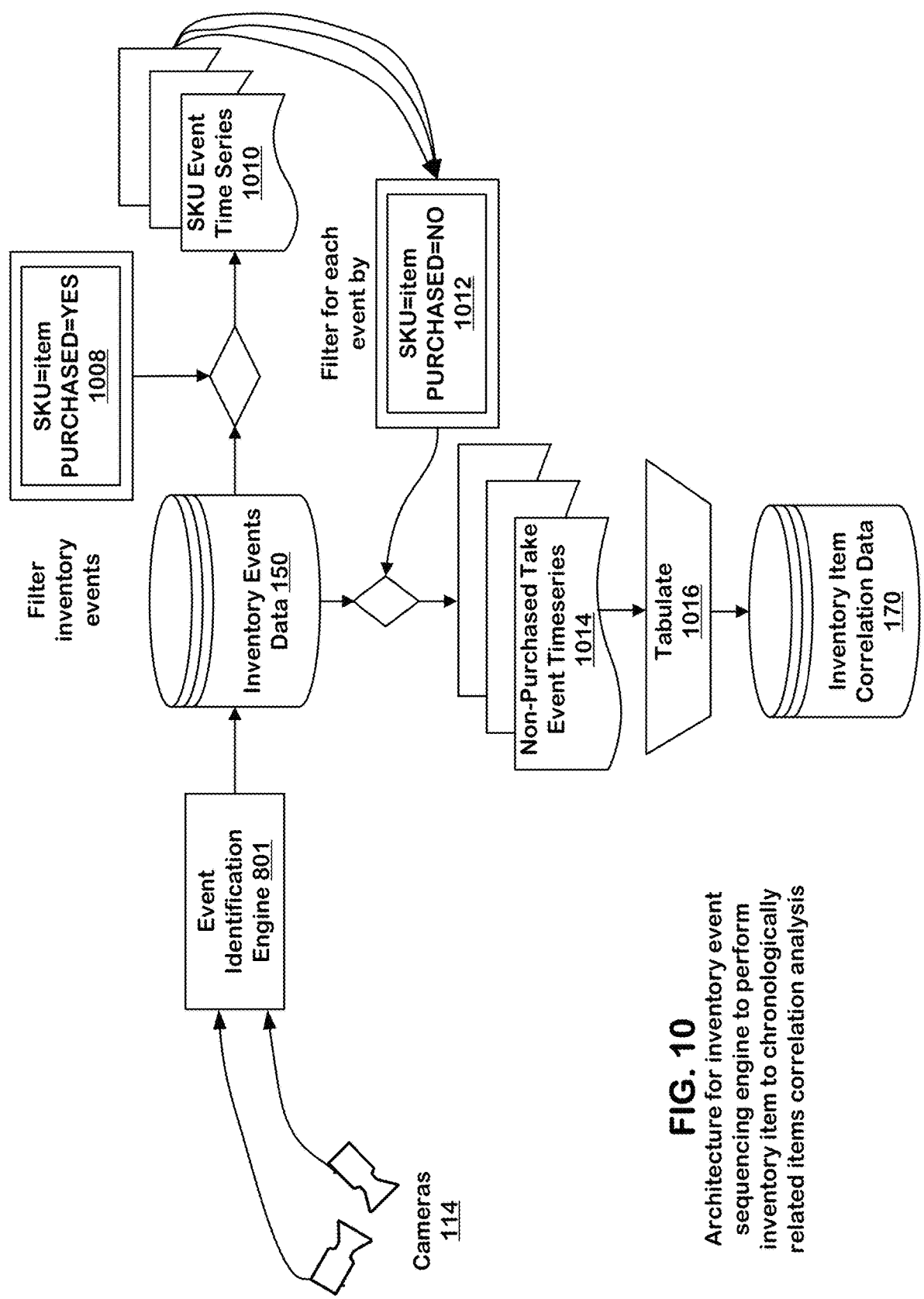
FIG. 10 is an example architecture in which the technique presented in the flowchart of FIG. 9 can be used to perform item correlation analysis.

FIG. 10 presents an example architecture for inventory event sequencing engine 190 to perform inventory item to chronologically related items correlation analysis. The system includes logic 1008 to filter inventory events entries in the database to select the events that match a particular inventory item identified by an item identifier such as an SKU. A second criteria in the selection query to select inventory events which resulted in the sale of the particular inventory event. For each subject identified in the selected inventory events, the system selects inventory events entries for the subject identified in a specified time period (such as 30 seconds) prior to the inventory event including the particular inventory item. This results in data sets including inventory items in the temporally ordered sequence of inventory events within the specified period of time. These data sets are shown as SKU event time series 1010 in FIG. 10. A second filter 1012 removes purchased items from each data set. Finally, the data sets 1014 include a temporally ordered sequence of events including items that were taken from the shelves but not purchased by the subjects. The tabulation logic 1016 selects the inventory items from the data sets using the selection criteria as described above. The resulting data is stored in the inventory item correlation database 170.

Network Configuration

Figure 11:
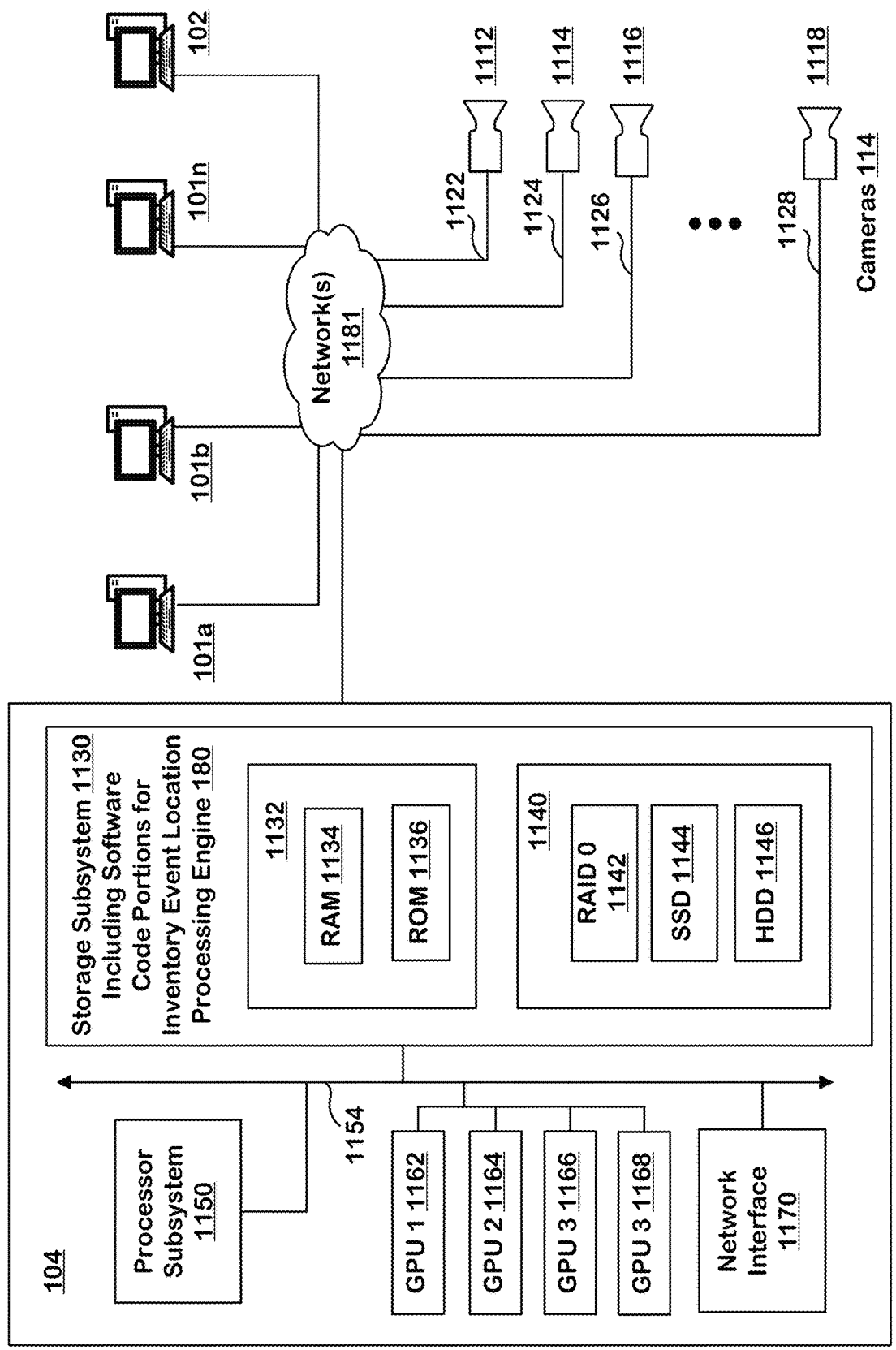
FIG. 11 is a camera and computer hardware arrangement configured for hosting the inventory event location processing engine and the inventory event sequencing engine of FIG. 1.

FIG. 11 presents an architecture of a network hosting the inventory event location processing engine 180 which is hosted on the network node 104. The system includes a plurality of network nodes 101*a*, 101*b*, 101*n*, and 102 in the illustrated embodiment. In such an embodiment, the network nodes are also referred to as processing platforms. Processing platforms (network nodes) 103, 101a-101n, and 102 and cameras 1112, 1114, 1116, . . . 1118 are connected to network(s) 1181. A similar network hosts the inventory event sequencing engine 190 which is hosted on the network node 106.

FIG. 11 shows a plurality of cameras 1112, 1114, 1116, . . . 1118 connected to the network(s). A large number of cameras can be deployed in particular systems. In one embodiment, the cameras 1112 to 1118 are connected to the network(s) 1181 using Ethernet-based connectors 1122, 1124, 1126, and 1128, respectively. In such an embodiment, the Ethernet-based connectors have a data transfer speed of 1 gigabit per second, also referred to as Gigabit Ethernet. It is understood that in other embodiments, cameras 114 are connected to the network using other types of network connections which can have a faster or slower data transfer rate than Gigabit Ethernet. Also, in alternative embodiments, a set of cameras can be connected directly to each processing platform, and the processing platforms can be coupled to a network.

Storage subsystem 1130 stores the basic programming and data constructs that provide the functionality of certain embodiments of the present invention. For example, the various modules implementing the functionality of the inventory event location processing engine 180 may be stored in storage subsystem 1130. The storage subsystem 1130 is an example of a computer readable memory comprising a non-transitory data storage medium, having computer instructions stored in the memory executable by a computer to perform all or any combination of the data processing and image processing functions described herein. In other examples, the computer instructions can be stored in other types of memory, including portable memory, that comprise a non-transitory data storage medium or media, readable by a computer.

These software modules are generally executed by a processor subsystem 1150. A host memory subsystem 1132 typically includes a number of memories including a main random access memory (RAM) 1134 for storage of instructions and data during program execution and a read-only memory (ROM) 1136 in which fixed instructions are stored. In one embodiment, the RAM 1134 is used as a buffer for storing point cloud data structure tuples generated by the inventory event location processing engine 180.

A file storage subsystem 1140 provides persistent storage for program and data files. In an example embodiment, the storage subsystem 1140 includes four 120 Gigabyte (GB) solid state disks (SSD) in a RAID 0 (redundant array of independent disks) arrangement identified by a numeral 1142. In the example embodiment, maps data in the maps database 140, inventory events data in the inventory events database 150, inventory item activity data in the inventory item activity database 160, and the inventory item correlation data in the inventory item correlation database 170 which is not in RAM is stored in RAID 0. In the example embodiment, the hard disk drive (HDD) 1146 is slower in access speed than the RAID 0 1142 storage. The solid state disk (SSD) 1144 contains the operating system and related files for the inventory event location processing engine 180.

In an example configuration, four cameras 1112, 1114, 1116, 1118, are connected to the processing platform (network node) 103. Each camera has a dedicated graphics processing unit GPU 1 1162, GPU 2 1164, GPU 3 1166, and GPU 4 1168, to process image frames sent by the camera. It is understood that fewer than or more than three cameras can be connected per processing platform. Accordingly, fewer or more GPUs are configured in the network node so that each camera has a dedicated GPU for processing the image frames received from the camera. The processor subsystem 1150, the storage subsystem 1130 and the GPUs 1162, 1164, and 1166 communicate using the bus subsystem 1154.

A network interface subsystem 1170 is connected to the bus subsystem 1154 forming part of the processing platform (network node) 104. Network interface subsystem 1170 provides an interface to outside networks, including an interface to corresponding interface devices in other computer systems. The network interface subsystem 1170 allows the processing platform to communicate over the network either by using cables (or wires) or wirelessly. A number of peripheral devices such as user interface output devices and user interface input devices are also connected to the bus subsystem 1154 forming part of the processing platform (network node) 104. These subsystems and devices are intentionally not shown in FIG. 11 to improve the clarity of the description. Although bus subsystem 1154 is shown schematically as a single bus, alternative embodiments of the bus subsystem may use multiple busses.

In one embodiment, the cameras 114 can be implemented using Chameleon3 1.3 MP Color USB3 Vision (Sony ICX445), having a resolution of 1288×964, a frame rate of 30 FPS, and at 1.3 MegaPixels per image, with Varifocal Lens having a working distance (mm) of 300–∞, a field of view field of view with a ⅓" sensor of 98.2°-23.8°.

Any data structures and code described or referenced above are stored according to many implementations in computer readable memory, which comprises a non-transitory computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method for identifying gestures in an area of real space, the method including:
   using a plurality of sensors to produce respective sequences of frames of corresponding fields of view in the area of real space;
   detecting subjects in the area of real space;
   during a first production phase that implements a first inference engine that is pre-trained to operate in a first production mode, switching the first inference engine from a first training mode to the first production mode to identify inventory items carried by the detected subjects in the sequence of frames, wherein the first production phase includes using a sequence of frames produced by a corresponding sensor in the plurality of sensors to identify the inventory items carried by the detected subjects;

during a second production phase that implements a second inference engine that is pre-trained to operate in a second production mode, switching the second inference engine from a second training mode to the second production mode to identify gestures of the detected subjects carrying the inventory items, wherein the second production phase includes using outputs of the first inference engine over a period of time to identify gestures of the detected subjects carrying the inventory items; and storing the identified gestures in a database.

2. The method of claim 1, further comprising producing inventory events using the detected subjects, the identified inventory items and data representing the identified gestures and storing the inventory events as entries in the database.

3. The method of claim 2, further including (i) determining a data set in the database, the data set including the inventory events for a particular inventory item in multiple locations in the area of real space, and (ii) displaying, on a user interface, a graphical construct indicating activity related to the particular inventory item in the multiple locations.

4. The method of claim 3, wherein the activity related to the particular inventory item includes counts of the inventory events including the particular inventory item in the multiple locations in the period of time.

5. The method of claim 3, wherein the activity related to the particular inventory item includes percentages of total inventory events, which include the particular inventory item, that have occurred in a particular location, of the multiple locations, in the period of time.

6. The method of claim 3, wherein the activity related to the particular inventory item includes levels of the particular inventory item relative to a threshold count at the multiple locations.

7. The method of claim 3, further including storing, with inventory events, a parameter indicating whether the particular inventory item is sold to a subject of the detected subjects.

8. The method of claim 3, further including matching the inventory events for a selected inventory item in multiple locations to cells in a plurality of cells having coordinates in the area of real space.

9. The method of claim 8, further including:

matching cells in the plurality of cells to inventory locations in inventory display structures in the area of real space; and generating heat maps for inventory locations using the activity related to a selected inventory item in multiple locations.

10. The method of claim 2, further including:

generating, for a particular inventory item, correlations to inventory events stored as entries in the database related to the particular inventory item; and determining, for a selected subject, a temporally ordered sequence of inventory events including a particular inventory event.

11. The method of claim 10, further including identifying an inventory item associated with an inventory event in the temporally ordered sequence of inventory events closest in time to the particular inventory event.

12. The method of claim 10, further including identifying an inventory item associated with an inventory event in the temporally ordered sequence of inventory events closest in time to the particular inventory event that indicates that the particular inventory item is sold.

13. The method of claim 10, further including filtering out inventory events, in the temporally ordered sequence of inventory events, including a parameter indicating inventory items as being sold to the selected subject.

14. The method of claim 10, wherein the determining, for the selected subject, of the temporally ordered sequence of inventory events including the particular inventory event, operates without use of personal identifying biometric information associated with the selected subject.

15. The method of claim 2, wherein the inventory events include a subject identifier identifying a detected subject, a gesture type of an identified gesture by the detected subject, an item identifier of an identified inventory item linked to the identified gesture by the detected subject, a location of the identified gesture represented by positions in three dimensions of the area of real space and a timestamp for the identified gesture.

16. The method of claim 1, further including (i) implementing the first inference engine to classify a hand of a detected subject and to identify an inventory item held in the classified hand and (ii) implementing the second inference engine to identify a gesture of the classified hand.

17. A system for identifying gestures in an area of real space, the system comprising:

a plurality of sensors, sensors in the plurality of sensors producing respective sequences of frames of corresponding fields of view in the real space; and a processing system coupled to the plurality of sensors and which detects subjects in the area of real space, the processing system having access to a database and including:

during a first production phase that implements a first inference engine that is pre-trained to operate in a first production mode, switching the first inference engine from a first training mode to the first production mode to identify inventory items carried by the detected subjects in the sequence of frames, wherein the first production phase includes using a sequence of frames produced by a corresponding sensor in the plurality of sensors to identify the inventory items carried by the detected subjects;

during a second production phase that implements a second inference engine that is pre-trained to operate in a second production mode, switching the second inference engine from a second training mode to the second production mode to identify gestures of the detected subjects carrying the inventory items, wherein the second production phase includes using outputs of the first inference engine over a period of time to identify gestures of the detected subjects carrying the inventory items; and logic to store the identified gestures in the database.

18. The system of claim 17, further including a plurality of first inference engines, the plurality of first inference engines including the first mentioned first inference engine, the plurality of first inference engines using the respective sequences of frames to identify inventory items held by detected subjects in the respective sequences of frames, wherein the second inference engine uses outputs of more than one of the first inference engines over the period of time to identify gestures of the detected subjects.

19. The system of claim 17, wherein the field of view of each sensor overlaps with the field of view of at least one other sensor in the plurality of sensors.

20. A non-transitory computer readable storage medium impressed with computer program instructions to track inventory events in an area of real space, the instructions when executed on a processor, implement a method comprising:
  using a plurality of sensors to produce respective sequences of frames of corresponding fields of view in the area of real space;
  detecting subjects in the area of real space;
  during a first production phase that implements a first inference engine that is pre-trained to operate in a first production mode, switching the first inference engine from a first training mode to the first production mode to identify inventory items carried by the detected subjects in the sequence of frames, wherein the first production phase includes using a sequence of frames produced by a corresponding sensor in the plurality of sensors to identify the inventory items carried by the detected subjects;
  during a second production phase that implements a second inference engine that is pre-trained to operate in a second production mode, switching the second inference engine from a second training mode to the second production mode to identify gestures of the detected subjects carrying the inventory items, wherein the second production phase includes using outputs of the first inference engine over a period of time to identify gestures of the detected subjects carrying the inventory items; and
  storing the identified gestures in a database.

* * * * *